(12) United States Patent
Hachiya et al.

(10) Patent No.: US 7,876,081 B2
(45) Date of Patent: Jan. 25, 2011

(54) DC-DC CONVERTER WITH SUBSTANTIALLY CONSTANT ON-TIME AND CONSTANT SWITCHING FREQUENCY

(75) Inventors: Shogo Hachiya, Chuo-ku (JP); Ko Takemura, Chuo-ku (JP)

(73) Assignee: Thine Electronics, Inc., Tokyo (JP)

( * ) Notice: Subject to any disclaimer, the term of this patent is extended or adjusted under 35 U.S.C. 154(b) by 6 days.

(21) Appl. No.: 12/279,098

(22) PCT Filed: Nov. 28, 2007

(86) PCT No.: PCT/JP2007/072935

§ 371 (c)(1),
(2), (4) Date: Aug. 12, 2008

(87) PCT Pub. No.: WO2008/066068

PCT Pub. Date: Jun. 5, 2008

(65) Prior Publication Data

US 2009/0237049 A1 Sep. 24, 2009

(30) Foreign Application Priority Data

Nov. 28, 2006 (JP) .............................. 2006-320660

(51) Int. Cl.
*G05F 1/565* (2006.01)
*G05F 1/575* (2006.01)
(52) U.S. Cl. .................... 323/284; 323/286; 323/288
(58) Field of Classification Search ......... 323/282–286, 323/288
See application file for complete search history.

(56) References Cited

U.S. PATENT DOCUMENTS

| 6,288,524 | B1 | 9/2001 | Tsujimoto | |
| 6,456,050 | B1 * | 9/2002 | Agiman | 323/282 |
| 6,476,589 | B2 * | 11/2002 | Umminger et al. | 323/282 |
| 6,495,995 | B2 * | 12/2002 | Groom et al. | 323/283 |
| 6,885,175 | B2 * | 4/2005 | Mihalka | 323/282 |
| 7,019,504 | B2 * | 3/2006 | Pullen et al. | 323/283 |
| 7,714,549 | B2 * | 5/2010 | Takemura | 323/244 |
| 2007/0090818 | A1 | 4/2007 | Nishimori | |
| 2009/0160414 | A1 * | 6/2009 | Hachiya et al. | 323/283 |

FOREIGN PATENT DOCUMENTS

| JP | 2000-287439 A | 10/2000 |
| JP | 2002-281744 A | 9/2002 |
| JP | 2005-348579 A | 12/2005 |
| JP | 2007-116823 A | 5/2007 |

* cited by examiner

*Primary Examiner*—Jeffrey L Sterrett
*Assistant Examiner*—Fred E Finch, III
(74) *Attorney, Agent, or Firm*—Sughrue Mion, PLLC

(57) ABSTRACT

A comparator-system DC-DC converter 1 according to an embodiment of the present invention comprises a control unit 200 which has a comparator section 20, 40 which compares the output voltage of the voltage conversion section with a reference voltage and determines a predetermined ON width of the ON pulse of the control signal Ssw or a predetermined OFF width of the OFF pulse of the control signal Ssw, and frequency control means 25 which compares the control signal Ssw with reference clock Cref and adjusts the ON width or OFF width so that the frequency of the control signal Ssw is constant. The frequency control means 25 detects a state where the output current of the voltage conversion section 100 is 0 A or a state where the output current is going to be 0 A and stops the processing to adjust the ON width or OFF width.

5 Claims, 25 Drawing Sheets

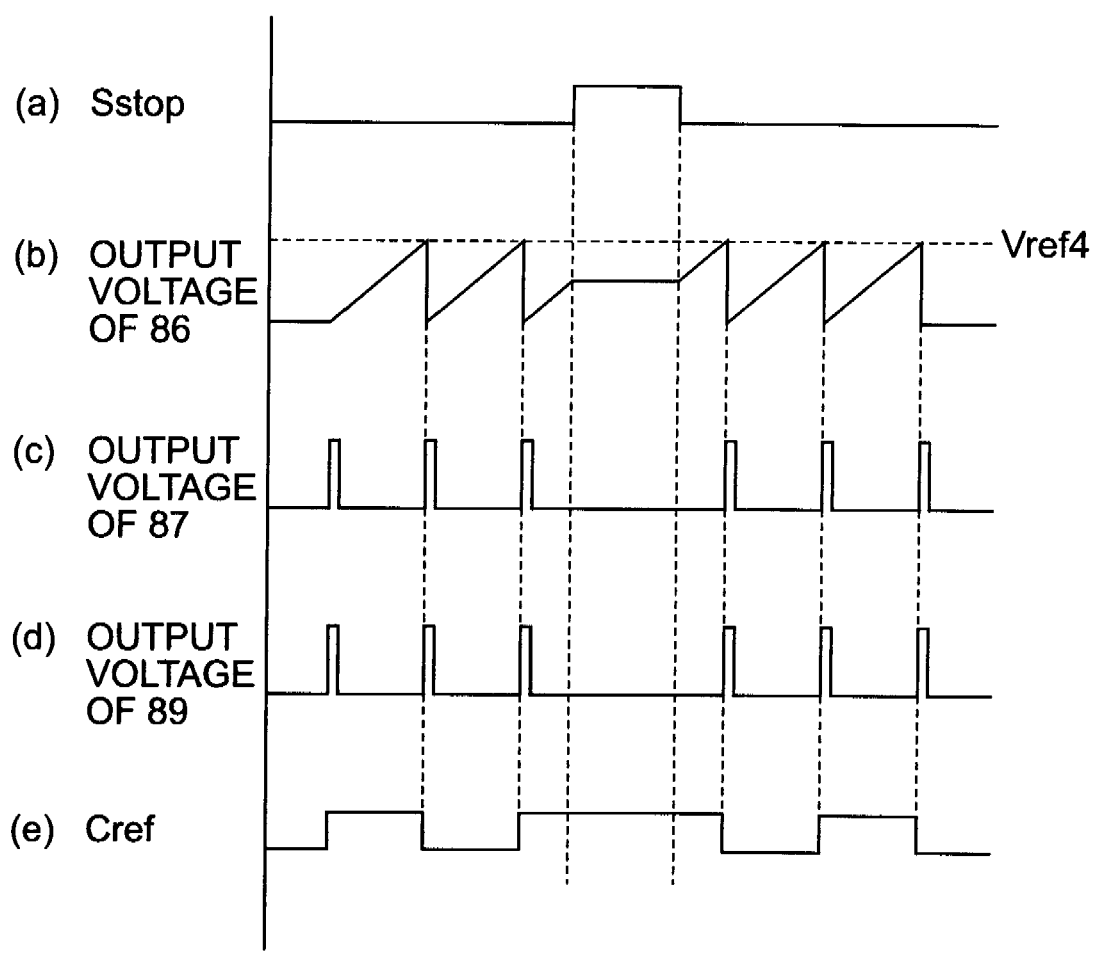

DC-DC CONVERTER WITH SUBSTANTIALLY CONSTANT ON-TIME AND CONSTANT SWITCHING FREQUENCY

TECHNICAL FIELD

The present invention relates to a comparator-system DC-DC converter.

BACKGROUND ART

DC-DC converters which generate an output voltage that is stabilized by an input voltage are known. A variety of systems have been proposed as means for stabilizing the output voltage of a DC-DC converter. For example, Patent Document 1 mentions a switching DC-DC converter which uses a PWM (pulse width modulation) system. With the PWM system, the output voltage can be stabilized by fixing the switching frequency and adjusting the ON pulse width. There are also switching DC-DC converters which employ a comparator system. With a comparator system, the output voltage can be stabilized by using the comparator to fix the ON pulse width and adjust the OFF pulse width (that is, the switching frequency).

This DC-DC converter is sometimes used as the power source of a PU (Processor Unit) or the like. When the PU moves from a standby state to a processing state, the current consumption increases suddenly. When the output voltage suddenly drops as a result of a sudden increase in the load current, the comparator-system DC-DC converter immediately outputs an ON pulse and, therefore, in comparison with a PWM system which is incapable of outputting a pulse in a predetermined OFF pulse period, the output voltage stabilizes rapidly. Thus, in comparison with a PWM system, a comparator-system DC-DC converter may have the characteristic of a favorable response characteristic with respect to a sudden increase in the load current.

[Patent Document 1] Japanese Patent Application Laid-Open No. 2000-287439

DISCLOSURE OF INVENTION

Problem to be Solved by the Invention

Furthermore, in a comparator-system DC-DC converter, the switching cycle Tf is Tf=Pon+Poff=Vout/Vin×Tf+((Vin−Vout)/Vin)×Tf . . . (Equation (1)) where the ON pulse width is Pon, the OFF pulse width is Poff, the input voltage is Vin, and the output voltage is Vout. Therefore, in cases where Vin and Vout are fixed, the ON pulse width Pon is constant and Poff is therefore fixed uniquely. In other words, with the comparator-system DC-DC converter, because the Pon is constant, if Vin and Vout are fixed, the ON duty for making the output voltage constant is fixed.

Here, for example, when the ambient temperature rises, the internal resistance of the circuit element increases and the internal loss increases. Here, with the comparator-system DC-DC converter, the OFF pulse width grows short and the ON duty increases in order to compensate for the drop in the output voltage due to the increase in the internal loss. Thus, with the comparator-system DC-DC converter, the switching frequency gradually fluctuates due to the fluctuations in the ambient temperature. Otherwise, the OFF pulse width also fluctuates and the switching frequency fluctuates due to fluctuations in the input voltage, output voltage, and output current. Due to fluctuations in the switching frequency, the ripple of the output voltage fluctuates and there is the possibility of a downstream circuit such as the PU operating erroneously. There is also the possibility of EMI countermeasures extending over a wide bandwidth being required.

However, although the switching frequency can be constant for a PWM-system DC-DC converter, in discontinuous mode, which has a period during which the load current is small and the output current is equal to or less than 0 A, the ON pulse width is sometimes excessively narrow. As a result, the possibility of a disturbance of the switching waveform exists. Circuit elements require a high speed characteristic.

Therefore, an object of the present invention is to provide a comparator-system DC-DC converter which is capable of reducing fluctuations in the switching frequency without impairing the response characteristic with respect to a sudden increase in the load current in a continuous load current mode and which is capable of suppressing an excessively narrow ON pulse width in the discontinuous load current mode.

Means for Solving the Problem

The comparator-system DC-DC converter of the present invention comprises a voltage conversion section which has an input terminal to which an input voltage is input and a pair of output terminals, and further has a switching element having one current terminal connected to the input terminal, an inductor having one end connected to the other current terminal of the switching element and another end connected to one of the pair of output terminals, and a smoothing capacitor connected between the pair of output terminals, the voltage conversion section generating an output voltage which is obtained by voltage-converting the input voltage, across the pair of output terminals by controlling the switching element in accordance with a control signal which is a pulse signal; and a control unit which generates the control signal for stabilizing the output voltage of the voltage conversion section. The control unit comprises a comparator section which compares the output voltage of the voltage conversion section with a reference voltage and determines a predetermined ON width of an ON pulse of the control signal or a predetermined OFF width of the OFF pulse of the control signal in accordance with the comparison result; and frequency control means which compares the control signal with a reference clock and adjusts the predetermined ON width of the ON pulse or the predetermined OFF width of the OFF pulse in accordance with the comparison result so that the repetition frequency of the control signal is constant. The frequency control means comprises an adjustment stoppage section which detects a state where an output current which flows in a direction from the switching element of the voltage conversion section toward the inductor is 0 A or a state where the output current is going to be 0 A and generates an adjustment stoppage signal which stops the processing of the frequency control means to adjust the predetermined ON width or the predetermined OFF width.

With the comparator-system DC-DC converter, in continuous load current mode, a predetermined ON width of the ON pulse (predetermined OFF width of the OFF pulse) is also adjusted by frequency control means in cases where the OFF width of the OFF pulse has narrowed as a result of an increase in the output current, for example (in cases where the ON width of the ON pulse has widened) and the frequency of the control signal is kept fixed. Therefore, in the continuous load current mode, fluctuations in the switching frequency can be reduced.

Here, the frequency control means keep the frequency of the control signal constant by adjusting the predetermined ON width of the ON pulse (predetermined OFF width of the OFF pulse). Hence, the ON width of the ON pulse is sometimes excessively narrow in the discontinuous load current mode as is the case with the PWM system.

However, with this comparator-system DC-DC converter, because the processing to adjust the predetermined ON width of the ON pulse (the predetermined OFF width of the OFF pulse) is stopped by the frequency control means in cases where the output current is 0 A or is going to be 0 A in the discontinuous load current mode, a narrowing of the ON width of the ON pulse is suppressed. Hence, in the discontinuous load current mode, a substantial narrowing of the ON width of the ON pulse can be suppressed.

The comparator section preferably comprises a first comparator which detects that the output voltage of the voltage conversion section is smaller than the reference voltage and determines the detection time point as the start time point of the ON pulse (OFF pulse); and a second comparator which detects that a predetermined time has elapsed since the start time point of the ON pulse (OFF pulse) and determines the detection time point as the end time point of the ON pulse (OFF pulse), and wherein the frequency control means preferably comprises an adjustment section which adjusts the predetermined ON width (the predetermined OFF width) by adjusting the predetermined time.

The frequency control means preferably comprises a reference clock generation section which generates the reference clock; and in cases where the frequency control means acquires the adjustment stoppage signal from the adjustment stoppage section, the reference clock generation section preferably temporarily stops the generation of the reference clock and stops the processing to adjust the predetermined ON width or the predetermined OFF width.

With a constitution of this kind, because the generation of the reference clock is temporarily stopped by the reference clock generation means in cases where the adjustment stoppage signal is acquired from the adjustment stoppage section, changes in the results of the comparison between the control signal and reference clock by the frequency control means can be stopped. The processing to adjust the predetermined ON width or the predetermined OFF width performed by the frequency control means can therefore be stopped.

Furthermore, in cases where the frequency control means acquires the adjustment stoppage signal from the adjustment stoppage section, the frequency control means may stop the comparison between the control signal and the reference clock and stop the processing to adjust the predetermined ON width or the predetermined OFF width.

With a constitution of this kind, because the comparison between the control signal and reference clock is stopped by the frequency control means in cases where the adjustment stoppage signal is acquired from the adjustment stoppage section, changes in the result of the comparison between the control signal and reference clock can be stopped. Hence, the processing to adjust the predetermined ON width or predetermined OFF width performed by the frequency control means can be stopped.

In addition, in cases where the adjustment stoppage signal is acquired from the adjustment stoppage section, the frequency control means may stop the processing to adjust the predetermined ON width or the predetermined OFF width by substituting the result of comparing the control signal with the reference clock, with a predetermined fixed value which is determined beforehand.

With a constitution of this kind, because the result of comparing the control signal with the reference clock is substituted with a predetermined fixed value which is determined beforehand by the frequency control means in cases where the adjustment stoppage signal is acquired from the adjustment stoppage section, the processing to adjust the predetermined ON width or the predetermined OFF width can be stopped.

EFFECTS OF THE INVENTION

The present invention makes it possible to obtain a comparator-system DC-DC converter which is capable of reducing fluctuations in the switching frequency without impairing the response characteristic with respect to a sudden increase in the load current in a continuous load current mode and which is able to suppress an excessively narrow ON pulse width in the discontinuous load current mode.

BRIEF DESCRIPTION OF DRAWINGS

FIG. 25 is a respective part signal waveform of a reference clock generation section according to a modified example.

Figure 1:
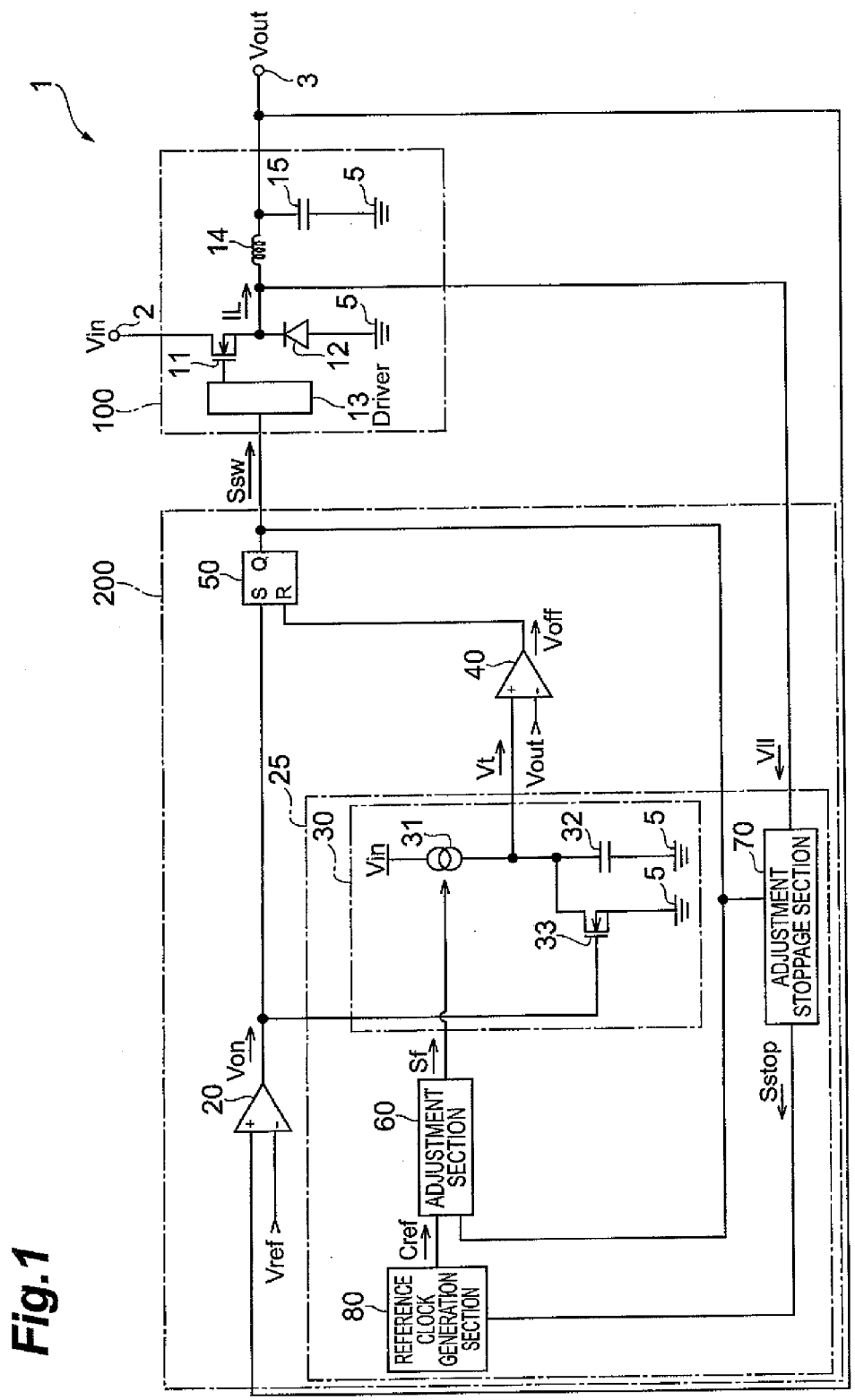
FIG. 1 is a circuit diagram which shows a comparator-system DC-DC converter according to a first embodiment of the present invention.

LIST OF ELEMENTS 1 comparator-system DC-DC converter
2 input terminal
3 output terminal
11 switching element
12 diode
13 drive circuit
14 inductor
15 smoothing capacitor
16, 17 resistance element
18 capacitor
20 first comparator (comparator section)
25 frequency control means
30 timer section
31 fixed current generation circuit (fixed current source)
32 timer capacitor
33 transistor
34 input voltage division circuit
35 voltage follower
36 resistance element
37 current mirror circuit
38 gm amplifier
40 second comparator (comparator section)
60 adjustment section
61 first counter
62 second counter
68 up/down counter
70 adjustment stoppage section
71 detected voltage division circuit
72 comparator
75 delay reset signal generation section
80 reference clock generation section
100 voltage conversion section
200 control unit

BEST MODE FOR CARRYING OUT THE INVENTION

Preferred embodiments of the present invention will be described in detail hereinbelow with reference to the drawings. The same reference numerals are assigned to the same parts or to equivalent parts in each of the drawings.

First Embodiment

FIG. 1 is a circuit diagram which shows a comparator-system DC-DC converter according to the first embodiment of the present invention. The comparator-system DC-DC converter 1 shown in FIG. 1 is constituted by a voltage conversion section 100 and a control unit 200.

The voltage conversion section 100 produces, at an output terminal 3, an output voltage Vout obtained by voltage-converting the input voltage Vin which is applied to the input terminal 2 in accordance with a switching control signal Ssw from the control unit 200. That is, the voltage conversion section 100 generates an output voltage Vout across a pair of output terminals which are constituted by an output terminal 3 and an output terminal (not shown) which is connected to GND5. The voltage conversion section 100 comprises a switching element 11, a diode 12, a drive circuit 13, an inductor 14, and a capacitor 15.

The switching element 11 is an N-type MOSFET and the two terminals thereof constitute a current element. The drain of the switching element 11 is connected to the input terminal 2 and the source of the switching element 11 is connected to the cathode of the diode 12. The anode of the diode 12 is grounded to GND5. The gate of the switching element 11 is connected to a drive circuit 13.

The drive circuit 13 generates a drive signal in accordance with the switching control signal Ssw from the control unit 200 and supplies the drive signal to the gate of the switching element 11.

One end of the inductor 14 is connected to the source of the switching element 11 and the cathode of the diode 12. The other end of the inductor 14 is connected to the output terminal 3. A capacitor (smoothing capacitor) 15 for smoothing the output voltage is connected between the other end of the inductor 14 and output terminal 3, and GND5.

The control unit 200 generates a switching control signal Ssw for stabilizing the output voltage Vout of the voltage conversion section 100. The control unit 200 comprises a first comparator 20, a timer section 30, a second comparator 40, an SR-FF50, an adjustment section 60, an adjustment stoppage section 70, and a reference clock generation section 80. According to this embodiment, the timer section 30, adjustment section 60, adjustment stoppage section 70, and reference clock generation section 80 function as frequency control means 25.

The positive input terminal of the first comparator 20 is connected to the output terminal 3 of the voltage conversion section 100 and a reference voltage Vref is input to the negative input terminal. The output terminal of the first comparator 20 is connected to the set terminal of the timer section 30 and SR-FF50.

The timer section 30 comprises a fixed current generation circuit 31, a timer capacitor 32, and a transistor 33. The fixed current generation circuit 31 is connected between the input terminal 2 and the timer capacitor 32 and supplies a charging current of a constant value to the timer capacitor 32. The fixed current generation circuit 31 is able to change the value of the charging current in accordance with a frequency control signal Sf from the adjustment section 60.

The timer capacitor 32 is connected between the fixed current generation circuit 31 and GND5. The transistor 33 is connected in parallel across the terminals of the timer capacitor 32. That is, the drain of the transistor 33 is connected to the node between the fixed current generation circuit 31 and one end of the timer capacitor 32 and the source of the transistor 33 is connected to GND5. An output voltage Von from the first comparator 20 is input to the gate of the transistor 33.

The node between the fixed current generation circuit 31 and one end of the timer capacitor 32 is connected to the positive input terminal of the second comparator 40. The output voltage Vout is input to the negative input terminal of the second comparator 40. The output terminal of the second comparator 40 is connected to the reset terminal of the SR-FF50.

The SR-FF50 ends the generation of the OFF pulse and starts the generation of the ON pulse of the switching control signal Ssw and ends the generation of the OFF pulse in accordance with the output voltage Von of the first comparator 20, and ends the generation of the ON pulse of the switching control signal Ssw and starts the generation of the OFF pulse in accordance with the output voltage Voff of the second comparator 40. The control signal Ssw is a pulse signal.

Thus, the first comparator 20 detects that the output voltage Vout of the voltage conversion section 100 is smaller than the reference voltage Vref, sets the SR-FF50 by producing a high-level pulse voltage Von, and determines the detection time point as the start time point of the ON pulse of the switching control signal Ssw.

In this embodiment, the fixed current generation circuit 31 receives the input voltage Vin which is connected to the input terminal 2. However, as long as the output supply source of the fixed current generation circuit 31 is at predetermined potential difference with respect to GND5 and is capable of supplying the output current required for the fixed current generation circuit 31, the fixed current generation circuit 31 is not limited to the input voltage Vin of input terminal 2.

Furthermore, the timer section 30 resets the voltage across the terminals of the timer capacitor 32 in accordance with the high-level pulse voltage Von of the first comparator 20 and subsequently functions as a timer by charging the timer capacitor 32 by means of a fixed current.

In addition, the second comparator 40 detects that the voltage across the terminals of the timer capacitor 32 of the timer section 30 is equal to or more than the output voltage Vout, that is, detects that a predetermined time has elapsed since the start time point of the ON pulse, and resets the SR-FF50 by producing the high level pulse voltage Voff, and determines the detection time point as the end time point of the ON pulse of the switching control signal Ssw.

In other words, the first comparator 20 and second comparator 40 function as comparator sections which determine the predetermined ON width of the ON pulse of the switching control signal Ssw.

The adjustment section 60 receives the switching control signal Ssw and a reference clock Cref which is generated by the reference clock generation section 80. The adjustment section 60 compares the switching control signal Ssw with the reference clock Cref and adjusts the predetermined ON width of the ON pulse so that the frequency of the switching control signal Ssw is constant in accordance with the comparison result. More specifically, the adjustment section 60 counts the ON pulses of the switching control signal Ssw, counts the reference clocks, and generates the frequency control signal Sf for adjusting the predetermined ON width of the ON pulse so that the count value of the switching control signal Ssw and the count value of the reference clock are equal. In the comparator-system DC-DC converter according to this embodiment, a frequency control signal Sf is a 4-bit digital signal.

The input terminal of the adjustment stoppage section 70 is connected to one end of the inductor 14 and the output terminal is connected to the reference clock generation section 80. The switching control signal Ssw is input to the reset terminal of the adjustment stoppage section 70. The adjustment stoppage section 70 detects the output current IL that flows in a direction toward the inductor 14 from the switching element 11 or the diode 12 and, in cases where the value of the output current IL is 0 A, stops the processing to adjust the predetermined ON width of the ON pulse. More specifically, the adjustment stoppage section 70 generates an adjustment stoppage signal Sstop for stopping the reference clock generation section 80 from the point where the resonance voltage V11 produced at one end of the inductor 14 is detected when the value of the output current IL is 0 A until the time point where the ON pulse of the switching control signal Ssw is produced.

The reference clock generation section 80 generates the reference clock Cref and stops the generation of the reference clock Cref in accordance with the adjustment stoppage signal Sstop from the adjustment stoppage section 70. More specifically, the reference clock generation section 80 latches the voltage level of the reference clock Cref in accordance with the adjustment stoppage signal Sstop and stops the generation of the reference clock Cref.

Figure 2:
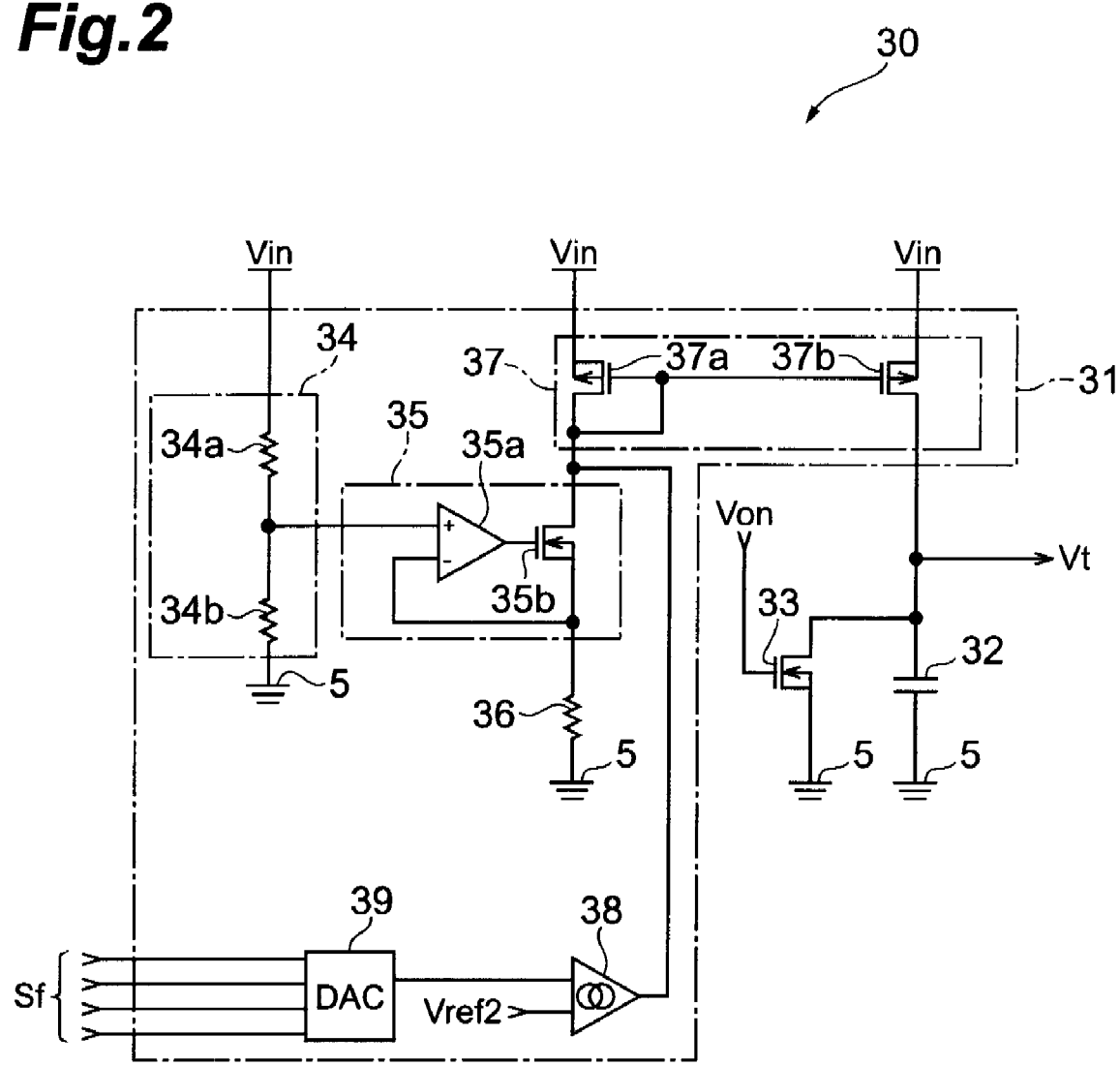
FIG. 2 is a circuit diagram which shows a timer section of FIG. 1.
Figure 3:
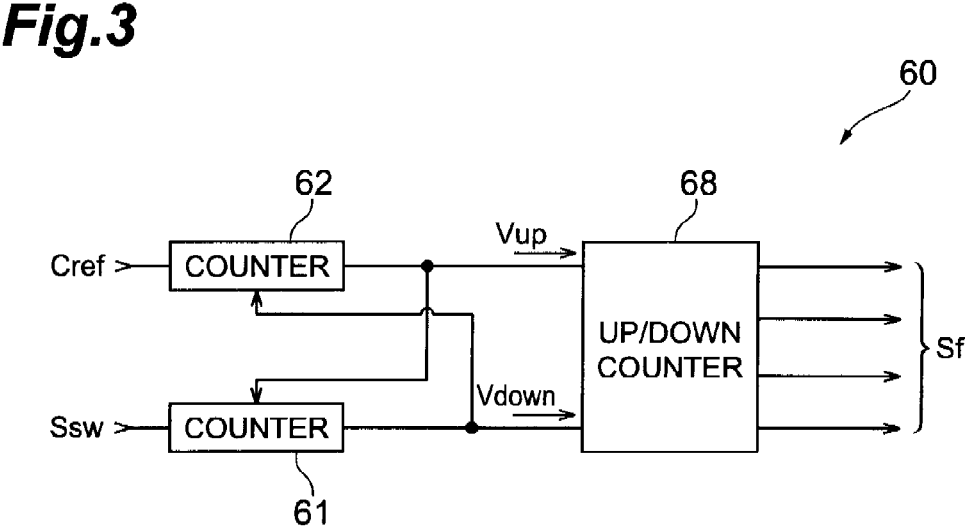
FIG. 3 shows a circuit diagram which shows an adjustment section of FIG. 1.
Figure 4:
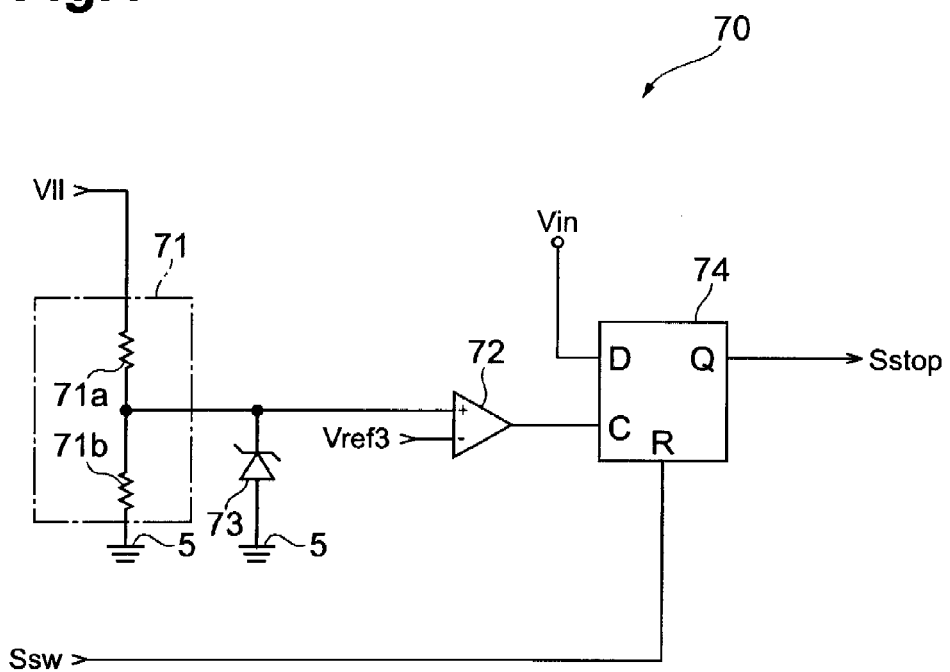
FIG. 4 is a circuit diagram which shows an adjustment stoppage section of FIG. 1.
Figure 5:
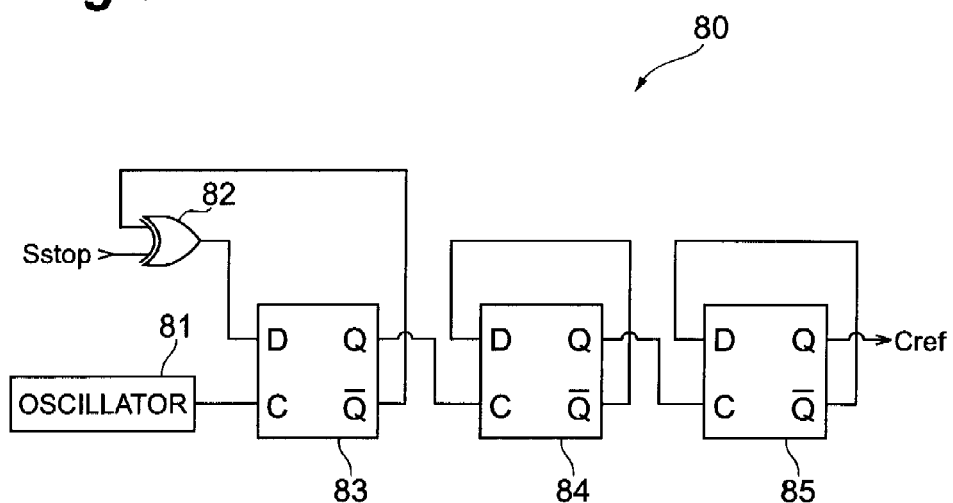
FIG. 5 is a circuit diagram which shows a reference clock generation section of FIG. 1.

The timer section 30, adjustment section 60, adjustment stoppage section 70, and reference clock generation section 80 will be described next in detail. FIG. 2 is a circuit which shows the timer section 30 of FIG. 1 and FIG. 3 is a circuit diagram which shows the adjustment section 60 of FIG. 1. Furthermore, FIG. 4 is a circuit diagram which shows the adjustment stoppage section 70 of FIG. 1 and FIG. 5 is a circuit diagram which shows the reference clock generation section 80 of FIG. 1.

First, the timer section 30 will be described. FIG. 2 shows the fixed current generation circuit 31 of the timer section 30 in detail. The fixed current generation circuit 31 comprises an input voltage division circuit 34, a voltage follower 35, a resistance element 36, a current mirror circuit 37, a gm amplifier 38, and a digital/analog conversion section (known as a 'DAC' hereinbelow) 39.

The input voltage division circuit 34 divides the input voltage Vin which is input from the input terminal 2. In this embodiment, the input voltage division circuit 34 is constituted by resistance elements 34*a* and 34*b* which are connected in series between the input terminal 2 and GND5. The divided voltage between the resistance elements 34*a* and 34*b* is input to the voltage follower 35.

The voltage follower 35 is constituted by an error difference amplifier 35*a* and a transistor 35*b*. In this embodiment, the transistor 35*b* is an n-type MOSFET. The resistance element 36 is connected between the source of the transistor 35*b* and GND5. Furthermore, the current mirror circuit 37 is connected between the drain of the transistor 35*b* and the input terminal 2.

The current mirror circuit 37 is constituted by a transistor 37*a* through which a reference current determined by the voltage follower 35 flows and a transistor 37*b* which generates a mirror current of the reference current which flows to the transistor 37*a*. In this embodiment, the transistors 37*a* and 37*b* are p-type MOSFETs. The transistor 37*b* supplies this mirror current to the timer capacitor 32.

The DAC 39 converts the 4-bit digital frequency control signal Sf from the adjustment section 60 into an analog signal. The output terminal of the DAC 39 is connected to one input terminal of the gm amplifier 38.

The reference voltage Vref2 is input to the other input terminal of the gm amplifier 38. The output terminal of the gm amplifier 38 is connected to a node between the transistor 37*a* of the current mirror circuit 37 and the voltage follower 35.

The gm amplifier 38 functions as a push/pull-type current source, drawing a current from the transistor 37*a* of the current mirror circuit 37 when the output signal of the DAC 39 is equal to or more than the reference voltage Vref2, for example, and supplying a current to the voltage follower 35 when the output signal of the DAC 39 is smaller than the reference voltage Vref2. In other words, the gm amplifier 38 increases the charging current of the timer capacitor 32 when Sf is equal to or more than Vref2 and reduces the charging current of the timer capacitor 32 when Sf is smaller than Vref2.

The adjustment section 60 will be described next. As shown in FIG. 3, the adjustment section 60 comprises two counters 61 and 62 and an up/down counter 68.

A switching control signal Ssw is input to the input terminal of the first counter 61 and the output voltage of the second counter 62 is input to the reset terminal of the first counter 61. For example, the first counter 61 is a 4-bit counter. The first counter 61 counts the ON pulse of the switching control signal Ssw and, in cases where the count value reaches the maximum value '1111', outputs the high-level pulse voltage Vdown and resets the output voltage at the next count of '1111'. In addition, the first counter 61 also resets the output voltage when the output voltage of the second counter 62 has reached a high level. The output terminal of the first counter 61 is connected to one input terminal of the up/down counter 68.

The reference clock Cref is input to the input terminal of the second counter 62 and the output voltage of the first counter 61 is input to the reset terminal of the second counter 62. The second counter 62 is a 4-bit counter, for example. The second counter 62 counts the reference clock cycles and, in cases where the count value has reached a maximum value '1111', outputs a high-level pulse voltage Vup and resets the output voltage at the next count of '1111'. In addition, the second counter 62 also resets the output voltage when the output voltage of the first counter 61 has reached a high level. The output terminal of the second counter 62 is connected to the other input terminal of the up/down counter 68.

The up/down counter 68 receives the pulse voltage from the first counter 61 and the pulse voltages Vdown and Vup from the second counter 62 and increases or reduces the count value. In this embodiment, the up/down counter 68 reduces the count value when a high-level pulse voltage Vdown is input by the first counter 61 and increases the count value when a high-level pulse voltage Vup is input by the second counter 62. The up/down counter 68 outputs the 4-bit digital frequency control signal Sf to the timer section 30.

The adjustment stoppage section 70 will be described next. As shown in FIG. 4, the adjustment stoppage section 70 comprises a detected voltage division circuit 71, a comparator 72, a Zener diode 73, and a D-FF74.

The detected voltage division circuit 71 divides the voltage V11 of one end of the inductor 14. In this embodiment, the detected voltage division circuit 71 is constituted by resistance elements 71a and 71b which are connected in series between one end of the inductor 14 and GND5. The divided voltage between the resistance elements 71a and 71b is input to the positive input terminal of the comparator 72.

The Zener diode 73 is connected between the positive input terminal of the comparator 72 and GND5. Here, the voltage V11 at one end of the inductor 14 rises to the input voltage Vin when the switching element 11 enters an ON state. The Zener diode 73 is provided in order to provide overvoltage protection for the input terminal of the comparator 72.

A reference voltage Vref3 is input to the negative input terminal of the comparator 72. The comparator 72 outputs a high-level pulse voltage when the resonance voltage V11 is produced at one end of the inductor 14 and the divided voltage between the resistance elements 71a and 71b is greater than the reference voltage Vref3. Thus, the comparator 72 functions as a current detection section which detects the time point at which the output current IL reaches 0 A by detecting the occurrence of the resonance voltage V11 at one end of the inductor 14. The output terminal of the comparator 72 is connected to the clock terminal of the D-FF74.

The input voltage Vin is input to the input terminal of the D-FF74 and the switching control signal Ssw is input to the reset terminal. The D-FF74 generates a high-level adjustment stoppage signal Sstop in the period from the time point at which a high-level pulse voltage is received from the comparator 72 until the time point at which a high-level switching control signal Ssw is received, that is, the period in which the output current IL is 0 A.

The reference clock generation section 80 will be described next. As shown in FIG. 5, the reference clock generation section 80 comprises an oscillator 81, an EXOR circuit 82, three D-FF83, 84, and 85.

The adjustment stoppage signal Sstop is input to one input terminal of the EXOR circuit 82 while the other input terminal is connected to the inverting output terminal of the D-FF83. The output terminal of the EXOR circuit 82 is connected to the input terminal of the D-FF83.

Clocks from the oscillator 81 are input to the clock terminal of the D-FF83 and the non-inverting output terminal is connected to the clock terminal of the D-FF84.

The input terminal of the D-FF84 is connected to the inverting output terminal and the output terminal of the D-FF84 is connected to the clock terminal of the D-FF85. Likewise, the input terminal of the D-FF85 is connected to the inverting output terminal and the D-FF85 outputs the reference clock Cref from the non-inverting output terminal.

Thus, the EXOR 82 and the D-FF 83, 84, and 85 constitute a clock division circuit and generate the reference clock Cref, which is obtained by dividing the clock from the oscillator into eight, when the adjustment stoppage signal Sstop is at a low level. In addition, the clock division circuit latches the voltage level of the reference clock Cref and stops the reference clock Cref when the adjustment stoppage signal Sstop is at a high level signal. In other words, the clock division circuit lowers the frequency of the reference clock Cref when the adjustment stoppage signal Sstop is a high level signal.

Figure 6:
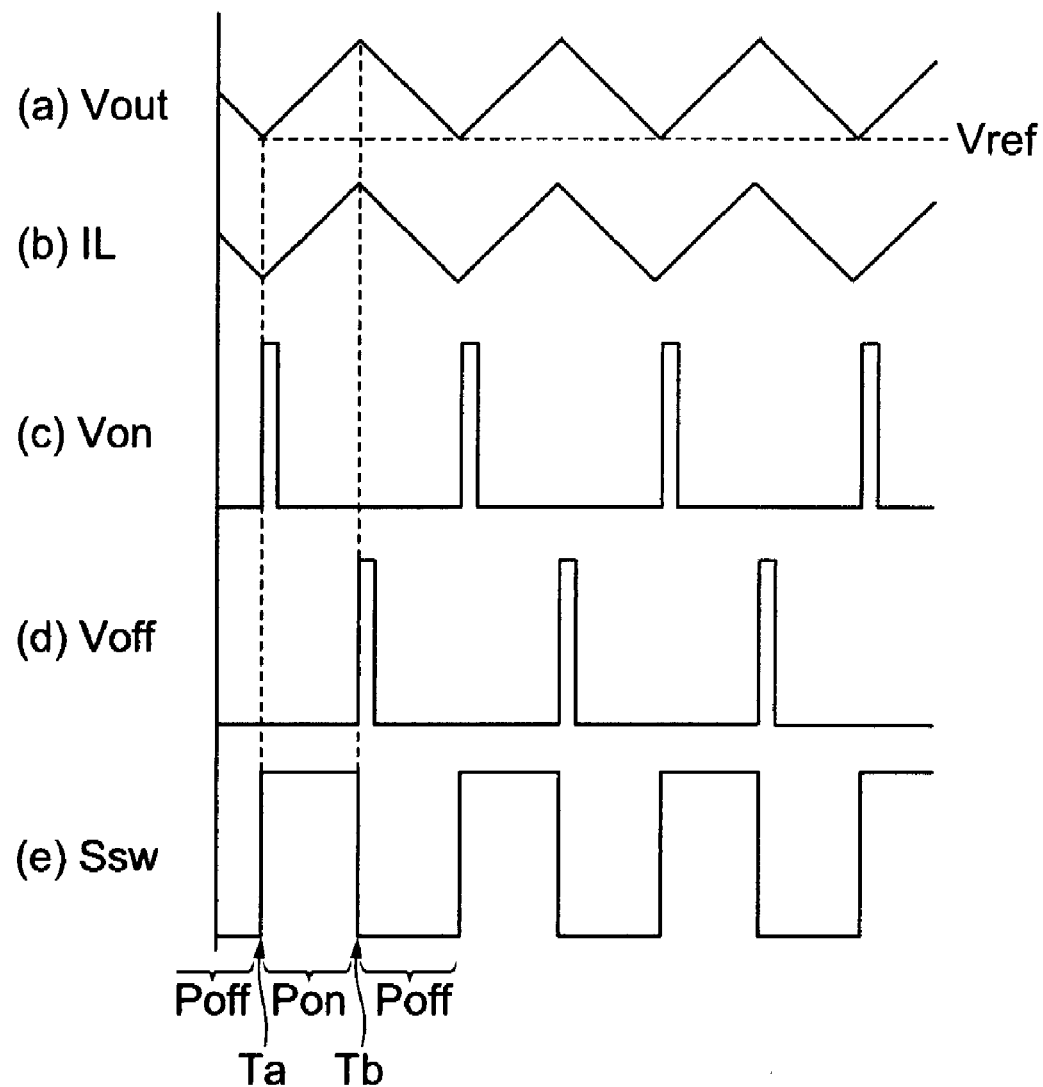
FIG. 6 is a timing chart which shows the respective signal waveforms of the continuous current mode of the comparator-system DC-DC converter shown in FIG. 1.
Figure 7:
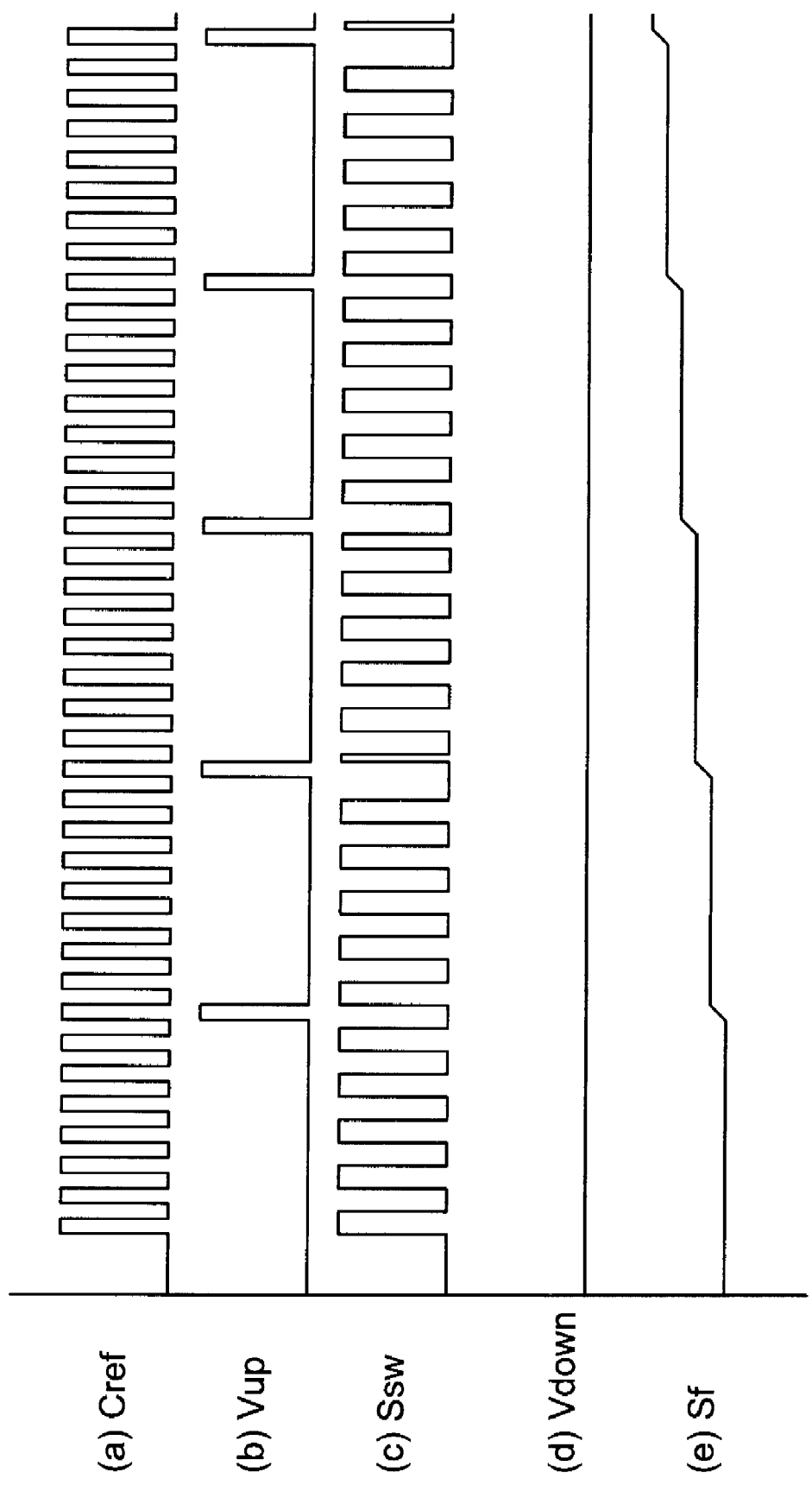
FIG. 7 is a timing chart which shows the respective signal waveforms of the continuous current mode of the adjustment section shown in FIG. 3.

The operation of the comparator-system DC-DC converter 1 will be described next. FIG. 6 is a timing chart which shows the respective signal waveforms of the continuous current mode of the comparator-system DC-DC converter 1 shown in FIG. 1 and FIG. 7 is a timing chart which shows the respective signal waveforms of the continuous current mode of the adjustment section 60 shown in FIG. 3.

First, when the input voltage Vin is input to the input terminal 2, the switching control signal Ssw is generated by the control unit 200. The voltage conversion section 100 produces a stabilized output voltage Vout at the output terminal 3 in accordance with the switching control signal Ssw.

Here, in cases where the load current is relatively large, the comparator-system DC-DC converter 1 operates in continuous current mode in which the output current is always greater than 0 A. Here, the ON pulse width Pon is set so that the switching frequency matches the frequency of the reference clock Cref.

When the output voltage Vout drops and reaches the reference voltage Vref ((a) of FIG. 6), a high-level pulse voltage Von is generated by the first comparator 20 ((c) of FIG. 6) and ON pulse Pon is produced from start time point Ta in the switching control signal Ssw by the SR-FF50 and the production of the OFF pulse Poff ends at time point Ta ((e) of FIG. 6). Thereupon, a high level drive signal is generated by the drive circuit 13 and the switching element 11 enters an ON state. As a result, the output current IL which flows to the inductor 14 increases and the output voltage Vout rises ((a) and (b) of FIG. 6).

When a high-level pulse voltage Von is generated by the first converter 20, the transistor 33 temporarily enters an ON state and the voltage across the terminals of the timer capacitor 32 is reset, whereupon the timer capacitor 32 is gradually charged by the fixed current from the fixed current generation circuit 31. When the voltage across the terminals of the timer capacitor 32 reaches the output voltage Vout, a high level pulse voltage Voff is generated by the second comparator 40 ((d) of FIG. 6), the OFF pulse Poff is produced from time point Tb in the switching control signal Ssw by the SR-FF 50, and the production of the ON pulse Pon ends at end time point Tb ((e) of FIG. 6). Thereupon, the drive signal is changed from a high level to a low level by the drive circuit 13 and the switching element 11 enters an OFF state. As a result, the output voltage Vout drops due to the power consumption of the connected load, and the output current IL decreases. The output voltage Vout is stabilized due to the repetition of the above operation.

Further, when the ambient temperature drops, for example, the internal resistance values of the switching element 11, diode 12, and inductor 14 or the like, for example, drop and the internal loss is reduced. Thereupon, in order to compensate for a rise in the output voltage Vout, the OFF width of the OFF pulse Poff increases and the ON duty is reduced. Meanwhile, the predetermined ON width of the ON pulse Pon is adjusted by the adjustment section 60.

More specifically, because the switching frequency of the switching control signal Ssw is lower than the frequency of the reference clock Cref ((a) and (c) of FIG. 7), the second counter 62 ends the count before the first counter 61 and outputs a high level pulse voltage Vup ((b) of FIG. 7). However, the output voltage Vdown of the first counter 61 remains at a low level ((d) of FIG. 7). As a result, the up/down counter 68 raises the value of the frequency control signal Sf ((e) of FIG. 7).

Thereupon, the gm amplifier 38 draws a current which is proportional to the differential voltage between the frequency control signal Sf and the reference voltage Vref2 and increases the charging current of the timer capacitor 32. As a result, the time taken for the voltage Vt across the terminals of the timer capacitor 32 to reach the output voltage Vout grows short and the end time point Tb of the ON pulse Pon is earlier. As a result, the ON width of the ON pulse Pon grows narrow and, because the ON duty is fixed by Vin and Vout, the OFF width of the OFF pulse Poff also narrows and the switching frequency rises. Thus, the adjustment section 60 controls the switching frequency so that same approaches the frequency of the reference clock Cref and the fluctuations in the switching frequency are therefore reduced.

However, when the ambient temperature rises, for example, the internal resistance values of the switching element 11, diode 12, and inductor 14, and so forth, for example, increase and the internal loss increases. Thereupon, in order to compensate for a drop in the output voltage Vout, the OFF width of the OFF pulse Poff narrows and the ON duty is increased. Meanwhile, the predetermined ON width of the ON pulse Pon is adjusted by the adjustment section 60.

More specifically, because the switching frequency of the switching control signal Ssw is higher than the frequency of the reference clock Cref, the first counter 61 ends the count before the second counter 62 and outputs a high-level pulse voltage Vdown. However, the output voltage Vup of the second counter 62 remains at a low level. As a result, the up/down counter 68 reduces the value of the frequency control signal Sf.

Thereupon, the gm amplifier 38 outputs a current which is proportional to the differential voltage between the frequency control signal Sf and the reference voltage Vref2 and reduces the charging current of the timer capacitor 32. As a result, the time taken for the voltage Vt across the terminals of the timer capacitor 32 to reach the output voltage Vout grows long and the end time point Tb of the ON pulse Pon is delayed. As a result, the ON width of the ON pulse Pon grows increases and, because the ON duty is fixed by Vm and Vout, the OFF width of the OFF pulse Poff also narrows and the switching frequency decreases. Thus, the adjustment section 60 controls the switching frequency so that same approaches the frequency of the reference clock Cref and the fluctuations in the switching frequency are therefore reduced.

The operation in the discontinuous current mode of the comparator-system DC-DC converter 1 will be described next. In cases where the load current is relatively small, the comparator-system DC-DC converter 1 operates in the discontinuous current mode in the period during which the output current is 0 A arises. Here, the adjustment processing to match the switching frequency with the frequency of the reference clock Cref is temporarily stopped and a narrowing of the ON width of the ON pulse is suppressed.

Figure 8:
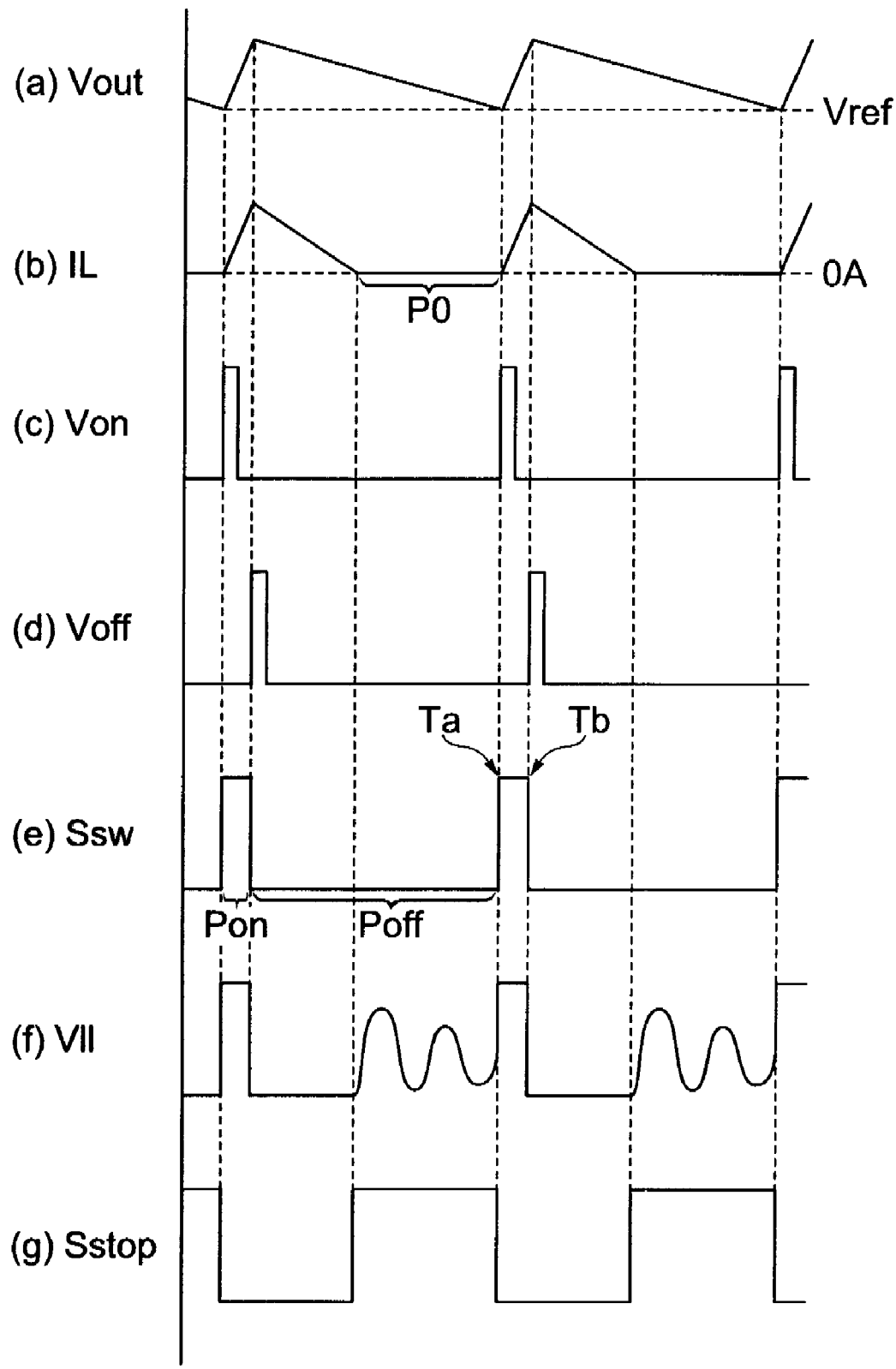
FIG. 8 is a timing chart which shows the respective signal waveforms of the discontinuous current mode of the comparator-system DC-DC converter shown in FIG. 1.
Figure 9:
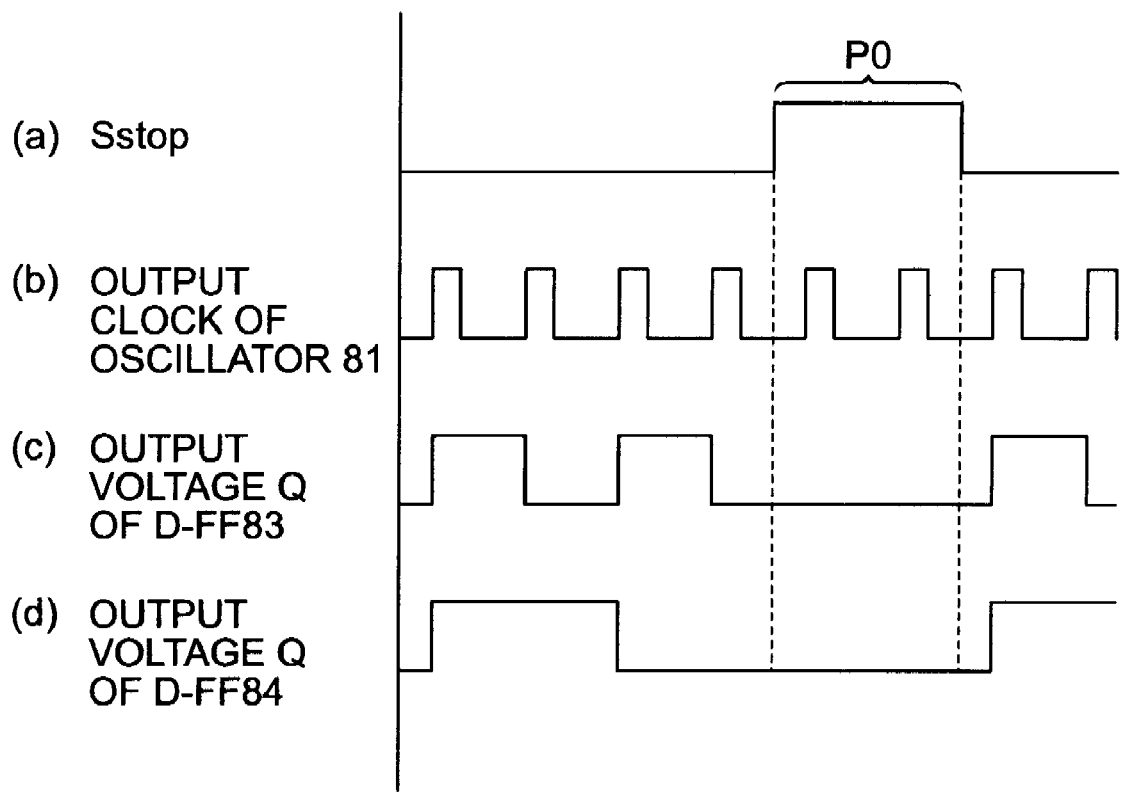
FIG. 9 is a timing chart which shows the respective signal waveforms of the discontinuous current mode of the reference clock generation section shown in FIG. 5.

FIG. 8 is a timing chart which shows the respective signal waveforms in the discontinuous current mode of the comparator-system DC-DC converter 1 shown in FIG. 1 and FIG. 9 is a timing chart which shows the respective signal waveforms of the discontinuous current mode of the reference clock generation section 80 shown in FIG. 5. Furthermore, FIG. 10 is a timing chart which shows the respective signal waveforms of the discontinuous current mode of the adjustment section 60 shown in FIG. 3.

In the event of a light load with a small load current, the time required to discharge the capacitor 15 is long and the drop time of the output voltage Vout increases ((a) of FIG. 8). Hence, the width of the OFF pulse Poff of the switching control signal Ssw increases and the frequency of the switching control signal Ssw drops ((e) of FIG. 8). Thereupon, in the period of the generation of the OFF pulse Poff, a period P0 in which the output current IL is 0 A occurs ((b) of FIG. 8) and the resonance voltage V11 is produced at one end of the inductor 14 from the time point at which the output current IL is 0 A ((f) of FIG. 8). The comparator 72 of the adjustment stoppage section 70 detects that the resonance voltage V11 is greater than the reference voltage Vref3 and outputs a high-level pulse voltage. Thereupon, a high-level adjustment stoppage signal Sstop is output by the D-FF 74 ((g) of FIG. 8). The generation of a high-level adjustment stoppage signal Sstop by the D-FF 74 continues until the start time point Ta of the generation of the ON pulse Pon in the switching control signal Ssw which is input to the reset terminal ((e) of FIG. 8). Thus, a high-level adjustment stoppage signal Sstop is generated by the adjustment stoppage section 70 in the period P0 in which the output current IL is 0 A.

When a high-level adjustment stoppage signal Sstop is generated ((a) of FIG. 9), the output voltage of the EXOR 82 of the reference clock generation section 80 is inverted and the level of a non-inverting output voltage Q of the D-FF 83 is latched and the level of the non-inverting output voltage Q of the D-FF 84 is latched ((d) of FIG. 9) in the period P0 in which the output current IL is 0 A ((c) of FIG. 9). As a result, the level of the reference clock Cref output by the D-FF 85 is latched in the period P0 in which the output current IL is 0 A.

Figure 10:
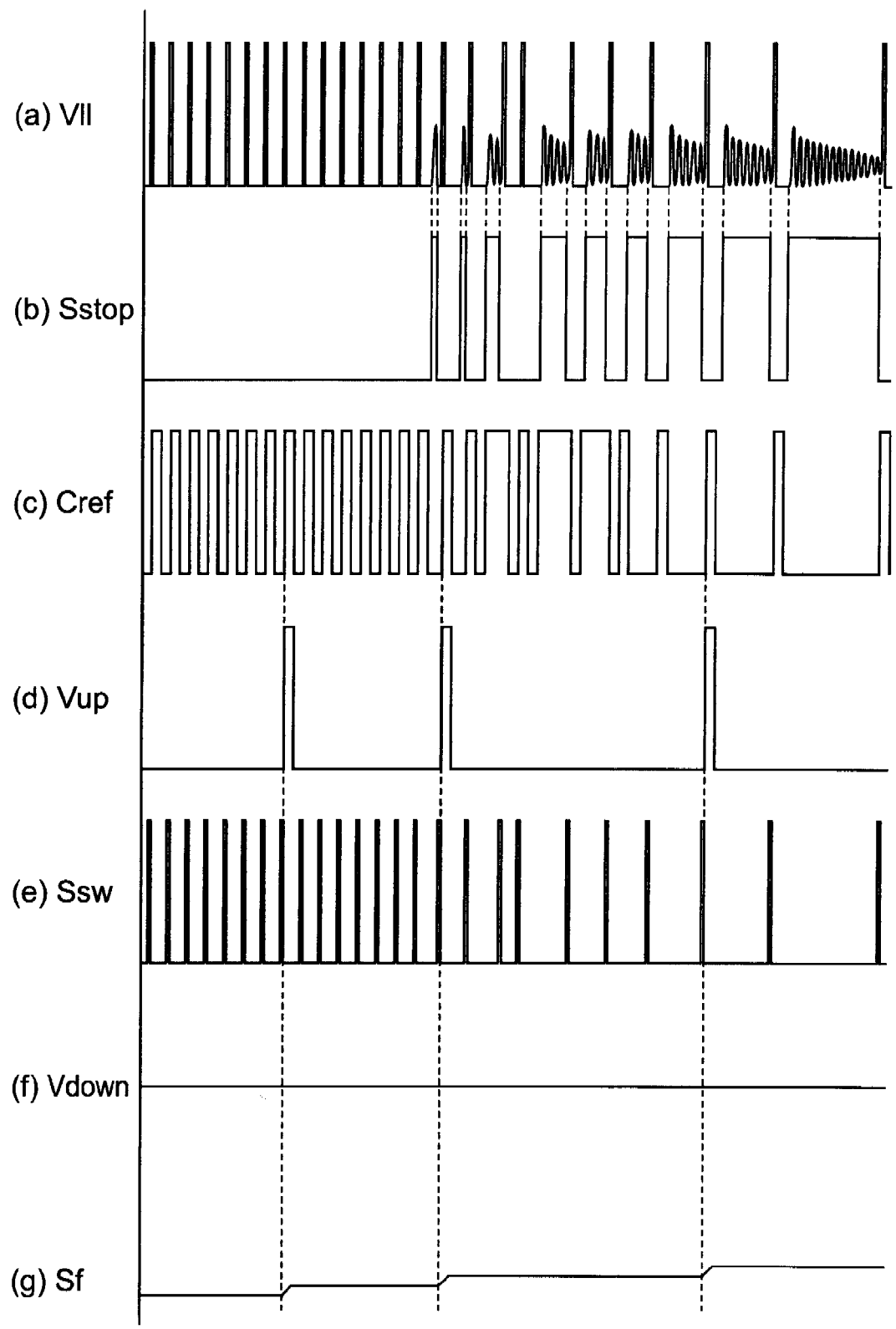
FIG. 10 is a timing chart which shows the respective signal waveforms of the discontinuous current mode of the adjustment section shown in FIG. 3.

Thus, when the adjustment stoppage signal Sstop is generated ((b) of FIG. 10) by the adjustment stoppage section 70 in accordance with the resonance voltage V11 at one end of the inductor 14 ((a) of FIG. 10), the voltage level of the reference clock Cref is latched ((c) of FIG. 10). As a result, the frequency of the reference clock Cref drops so as to approach the frequency of the switching control signal Ssw ((c) and (e) of FIG. 10), the count of the second counter 62 is delayed. Thereupon, the generation of the high-level pulse voltage Vup is suppressed ((d) of FIG. 10), and an increase in the frequency control signal Sf is suppressed ((g) of FIG. 10). As a result, even when the frequency of the switching control signal Ssw drops in the discontinuous current mode, the adjustment of the ON width of the ON pulse Pon is suppressed and a narrowing of the ON width of the ON pulse Pon is suppressed.

Figure 11:
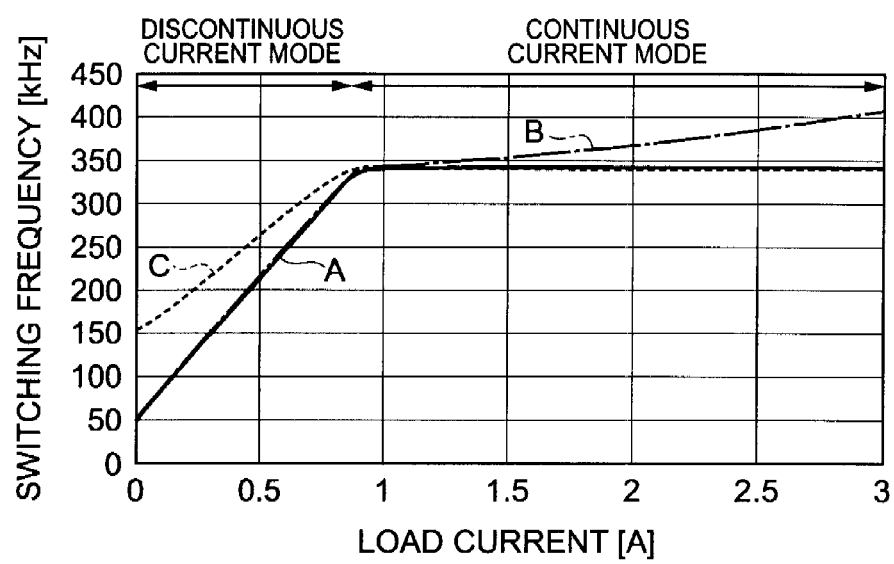
FIG. 11 shows the switching frequency characteristic with respect to the load current of the comparator-system DC-DC converter shown in FIG. 1.

FIG. 11 shows the switching frequency characteristic with respect to the load current of the comparator-system DC-DC converter 1 shown in FIG. 1. FIG. 11 shows the simulation effect of a comparator-system DC-DC converter of a comparative example in addition to the simulation effect of the comparator-system DC-DC converter 1 of this embodiment.

Curve A shows the simulation effect of the comparator-system DC-DC converter 1 of this embodiment. Curve B shows the simulation effect of a comparator-system asynchronous rectification DC-DC converter of a Comparative Example 1 which is a constitution not comprising the adjustment section 60 and adjustment stoppage section 70 of the comparator-system DC-DC converter 1 of this embodiment. Curve C shows the simulation effect of a comparator-system synchronous rectification DC-DC converter of a Comparative Example 2 which is a constitution not comprising the adjustment stoppage section 70 of the comparator-system DC-DC converter 1 of this embodiment.

As indicated by curve C, the comparator-system asynchronous rectification DC-DC converter of Comparative Example 1 produces an increase in the switching frequency as the load current increases in the continuous current mode. Hence, due to fluctuations in the switching frequency in the continuous current mode which is the actual usage state, the ripple of the output voltage fluctuates and there is the possibility of a downstream circuit such as the PU operating erroneously. There is also the possibility of EMI countermeasures extending over a wide bandwidth being required.

Furthermore, as indicated by curve C, the comparator-system synchronous rectification DC-DC converter of Comparative Example 2 sometimes over-reduces the ON width of the switching waveform in an attempt to keep the switching frequency constant when the load current decreases in the discontinuous current mode. Irrespective of whether the load current is small, the loss increases as a result of switching with a narrow ON width being performed at a high frequency. Hence, the power consumed cannot be adequately reduced.

In contrast, as indicated by curve A, the switching frequency can be kept constant in the continuous current mode as a result of providing the adjustment section 60 and adjustment stoppage section 70 as per the comparator-system DC-DC converter 1 of this embodiment, and an excessive narrowing of the ON width can be suppressed by stopping the processing to adjust the switching frequency in the discontinuous current mode.

Thus, according to the comparator-system DC-DC converter 1 of the first embodiment, in the continuous current mode, the fluctuations in the switching frequency which arise due to fluctuations in the conversion loss due to fluctuations in the ambient temperature, fluctuations in the I/O voltages, and fluctuations in the output current can be reduced without impairing the response characteristic with respect to a sudden increase in the load current. As a result, in the continuous current mode, fluctuations in the output voltage ripple can be reduced and erroneous operation of a downstream circuit such as the PU can be prevented. Furthermore, EMI countermeasures extending over a wide bandwidth are not required, and EMI countermeasures can be carried out inexpensively and in a straightforward manner.

However, in discontinuous current mode, processing to adjust the ON width of the ON pulse can be stopped in the period in which the output current is 0 A. Accordingly, the fact that the ON width of the ON pulse narrows greatly can be suppressed in discontinuous current mode and disturbance of the switching waveform can be reduced. In addition, there is no need to employ costly circuit elements with a high-speed characteristic. In addition, the loss caused by performing switching with a narrow ON width at a high frequency can be suppressed irrespective of whether the load current is small. Hence, the power consumption can be reduced.

Second Embodiment

Figure 12:
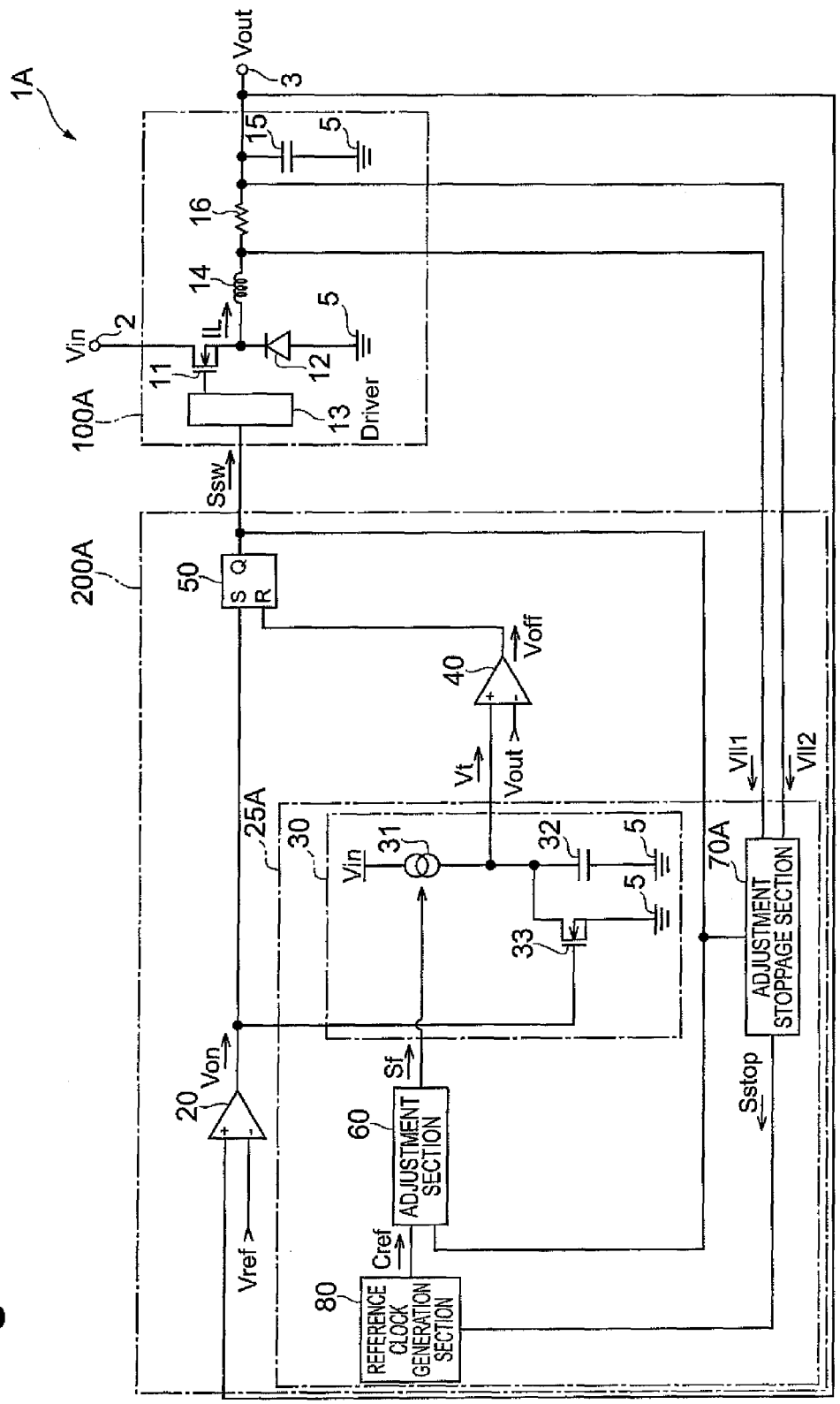
FIG. 12 is a circuit diagram which shows a comparator-system DC-DC converter according to a second embodiment of the present invention.

FIG. 12 is a circuit diagram which shows a comparator-system DC-DC converter according to the second embodiment of the present invention. The comparator-system DC-DC converter 1A shown in FIG. 12 differs from the comparator-system DC-DC converter 1 in the first embodiment in that the comparator-system DC-DC converter 1A comprises a voltage conversion section 100A and a control unit 200A in place of the voltage conversion section 100 and control unit 200 of the comparator-system DC-DC converter 1.

The voltage conversion section 100A further comprises a resistance element (current detection resistance element) 16 which is serially connected to the inductor 14 in the voltage conversion section 100. The remaining constitution of the voltage conversion section 100A is the same as that of the voltage conversion section 100.

The control unit 200A differs from the control unit 200 in that the control unit 200A comprises an adjustment stoppage section 70A instead of the adjustment stoppage section 70 of the control unit 200. The remaining constitution of the control unit 200A is the same as that of the control unit 200. In this embodiment, the timer section 30, adjustment section 60, adjustment stoppage section 70A, and reference clock generation section 80 function as frequency control means 25A.

Figure 13:
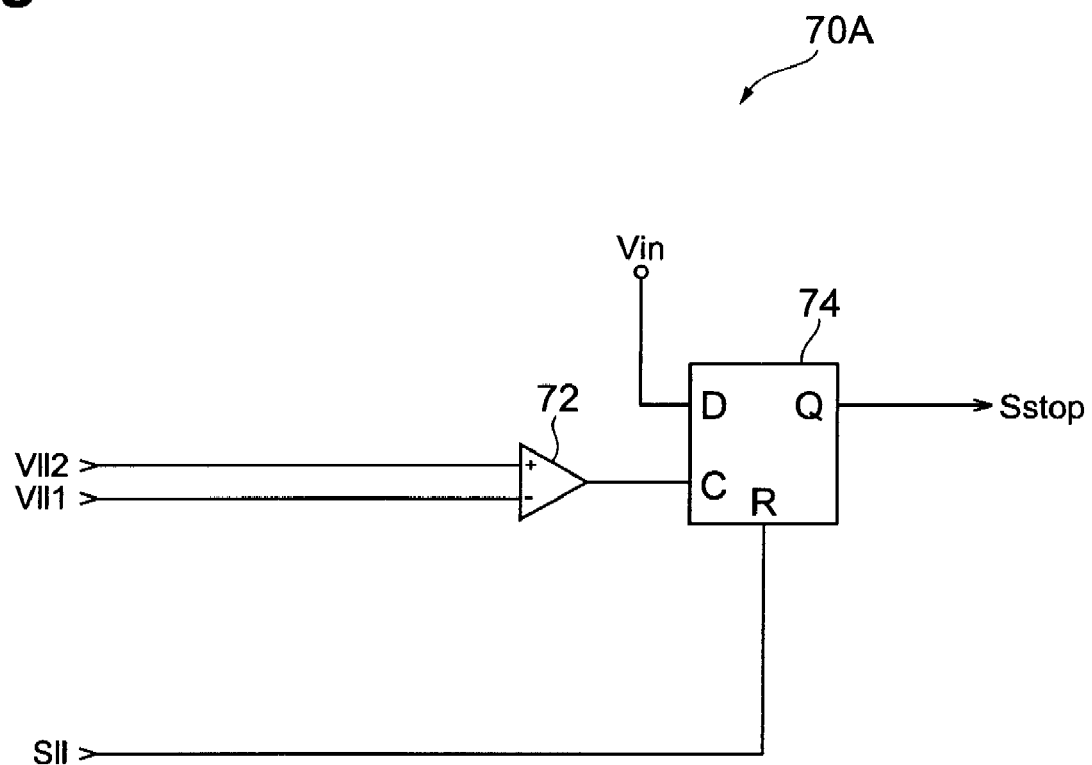
FIG. 13 is a circuit diagram which shows an adjustment stoppage section shown in FIG. 12.

FIG. 13 is a circuit diagram which shows an adjustment stoppage section 70A shown in FIG. 12. The adjustment stoppage section 70A shown in FIG. 13 differs from the adjustment stoppage section 70 in that the adjustment stoppage section 70A does not comprise the detected voltage division circuit 71 and Zener diode 73 of the adjustment stoppage section 70.

The comparator 72 detects the voltage across the terminals of the resistance element 16 in order to detect the output current IL. More specifically, the positive input terminal of the comparator 72 is connected to a node between the inductor 14 and resistance element 16 and the negative input terminal is connected to a node between the resistance element 16 and output terminal Vout. In other words, a voltage V111 which is a high voltage is input in continuous current mode to the negative input terminal of the comparator 72 and a voltage V112 which is a low voltage is input to the positive input terminal. The comparator 72 detects that the voltage V111 and voltage V112 are to be equal or mutually inverted and outputs a high-level pulse voltage. Thus, the comparator 72 functions as a current detection section which detects a state where the output current IL is 0 A or a state where the output current is going to be 0 A by detecting the voltage difference between voltage V111 and voltage V112. The detection of the state where the output current IL is going to be 0 A can be implemented by applying a predetermined forward-bias voltage to the positive input terminal of the comparator 72, for example.

The same benefits as those of the first embodiment can also be obtained by the comparator-system DC-DC converter 1A of the second embodiment.

Third Embodiment

Figure 14:
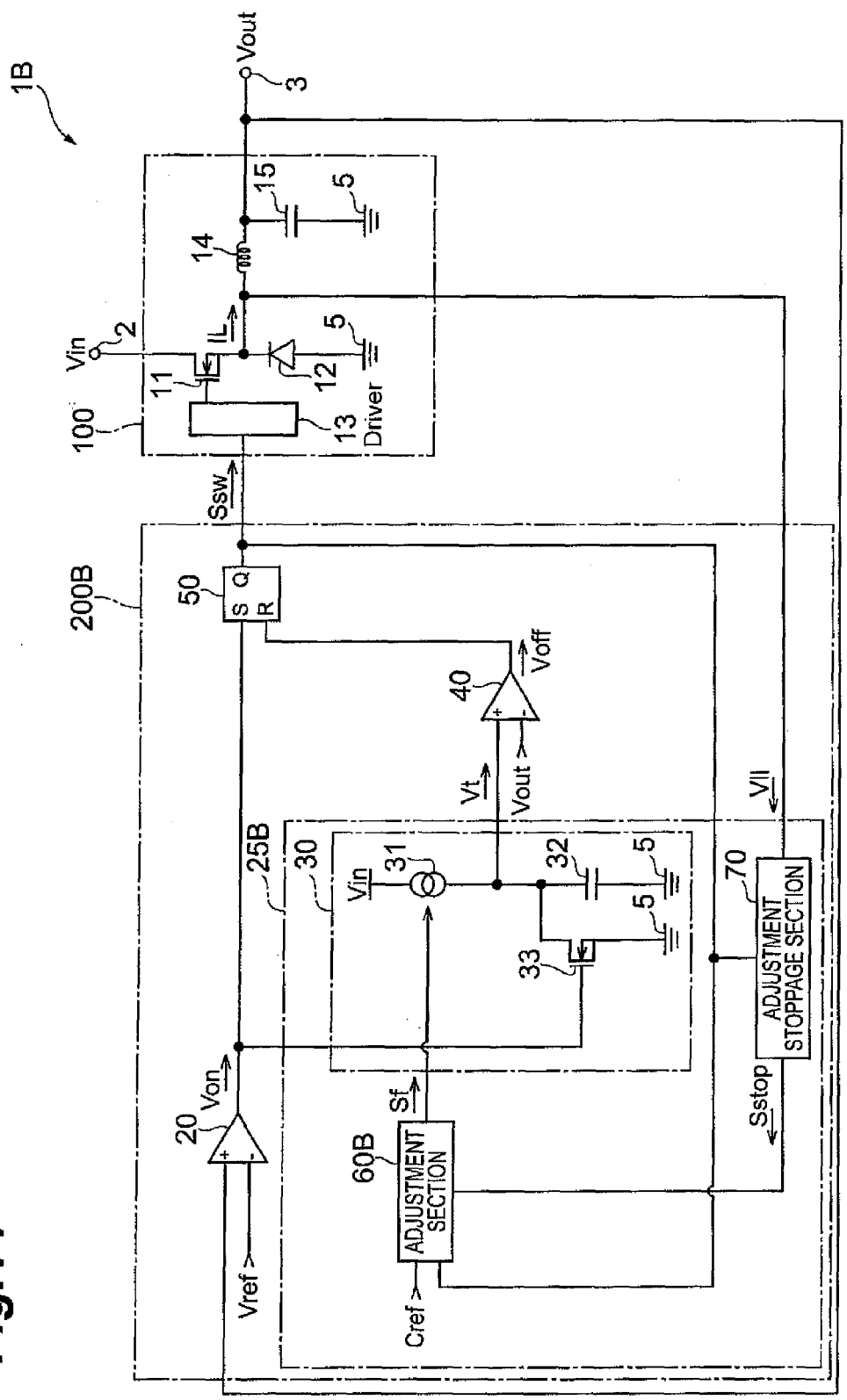
FIG. 14 is a circuit diagram which shows a comparator-system DC-DC converter according to a third embodiment of the present invention.

FIG. 14 is a circuit diagram which shows a comparator-system DC-DC converter according to the third embodiment of the present invention. The comparator-system DC-DC converter 1B shown in FIG. 14 differs from the comparator-system DC-DC converter 1 in the first embodiment in that the comparator-system DC-DC converter 1B comprises a control unit 200B in place of the control unit 200 of the comparator-system DC-DC converter 1. The remaining constitution of the comparator-system DC-DC converter 1B is the same as that of the comparator-system DC-DC converter 1.

The control unit 200B comprises an adjustment section 60B in place of the adjustment section 60 in the control unit 200. Furthermore, the control unit 200B differs from the control unit 200 in that the control unit 200B uses an externally generated reference clock Cref and does not comprise the reference clock generation section 80 of the control unit 200. The remaining constitution of the control unit 200B is the same as that of the control unit 200. In this embodiment, the timer section 30, adjustment section 60B, and adjustment stoppage section 70B function as frequency control means 25B.

Figure 15:
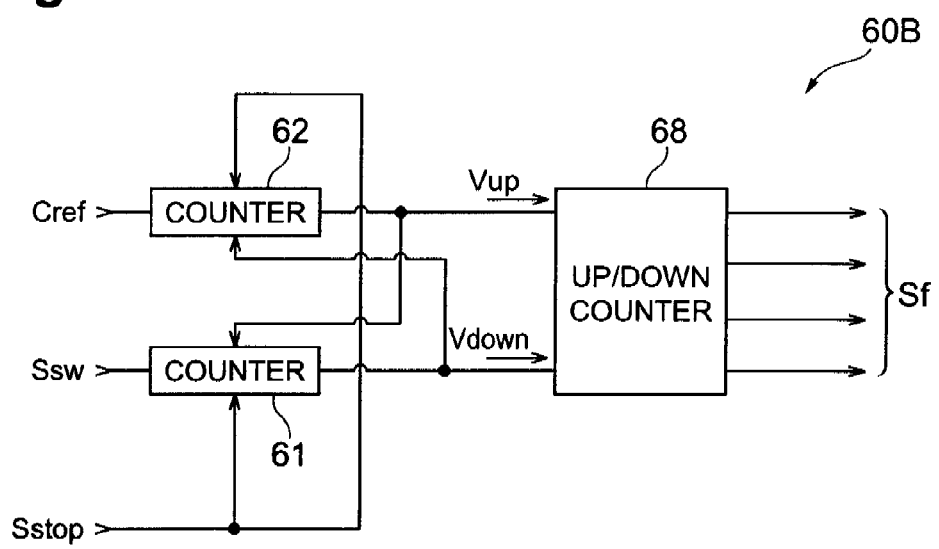
FIG. 15 is a circuit diagram which shows an adjustment section shown in FIG. 14.

FIG. 15 is a circuit diagram which shows the adjustment section 60B which is shown in FIG. 14. The adjustment section 60B which is shown in FIG. 15 differs from the adjustment section 60 in that the adjustment stoppage signal Sstop which is output by the adjustment stoppage section 70 is input to each of the control terminals of the first counter 61 and second counter 62. The remaining constitution of the adjustment section 60B is the same as that of the adjustment section 60.

Figure 16:
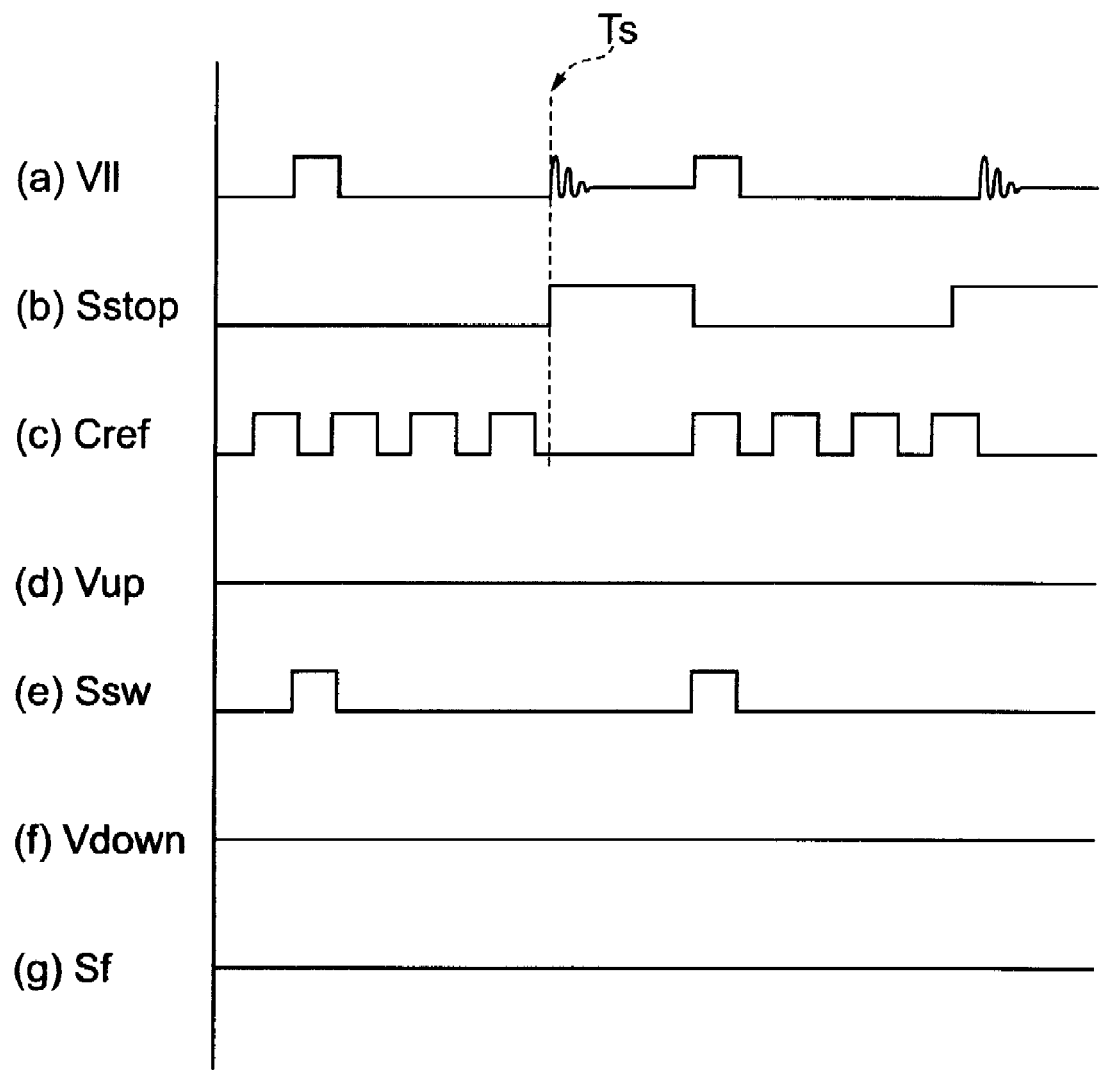
FIG. 16 is a timing chart which shows the respective signal waveforms in the discontinuous current mode of the adjustment section shown in FIG. 15.

FIG. 16 is a timing chart which shows the respective signal waveforms in the discontinuous current mode of the adjustment section 60B which is shown in FIG. 15.

When a high-level adjustment stoppage signal Sstop is input to the first counter 61 and second counter 62 ((b) of FIG. 16), the first counter 61 and second counter 62 stop counting (time point Ts of (c) of FIG. 16). In other words, the first counter 61 and second counter 62 reset the count values, that is, the output voltages.

As a result, when the output current reaches 0 A in the discontinuous current mode, because the count values are reset prior to the first counter 61 and second counter 62 ending the count up to a predetermined value, a high-level pulse voltage Vup is not produced ((d) of FIG. 16) and the frequency control signal Sf does not rise ((g) of FIG. 16). As a result, even when the frequency of the switching control signal Ssw drops in the discontinuous current mode, the adjustment of the ON width of the ON pulse Pon is stopped.

Thus, the comparator-system DC-DC converter 1B of the third embodiment also allows the same benefits as those of the first embodiment to be obtained.

Fourth Embodiment

Figure 17:
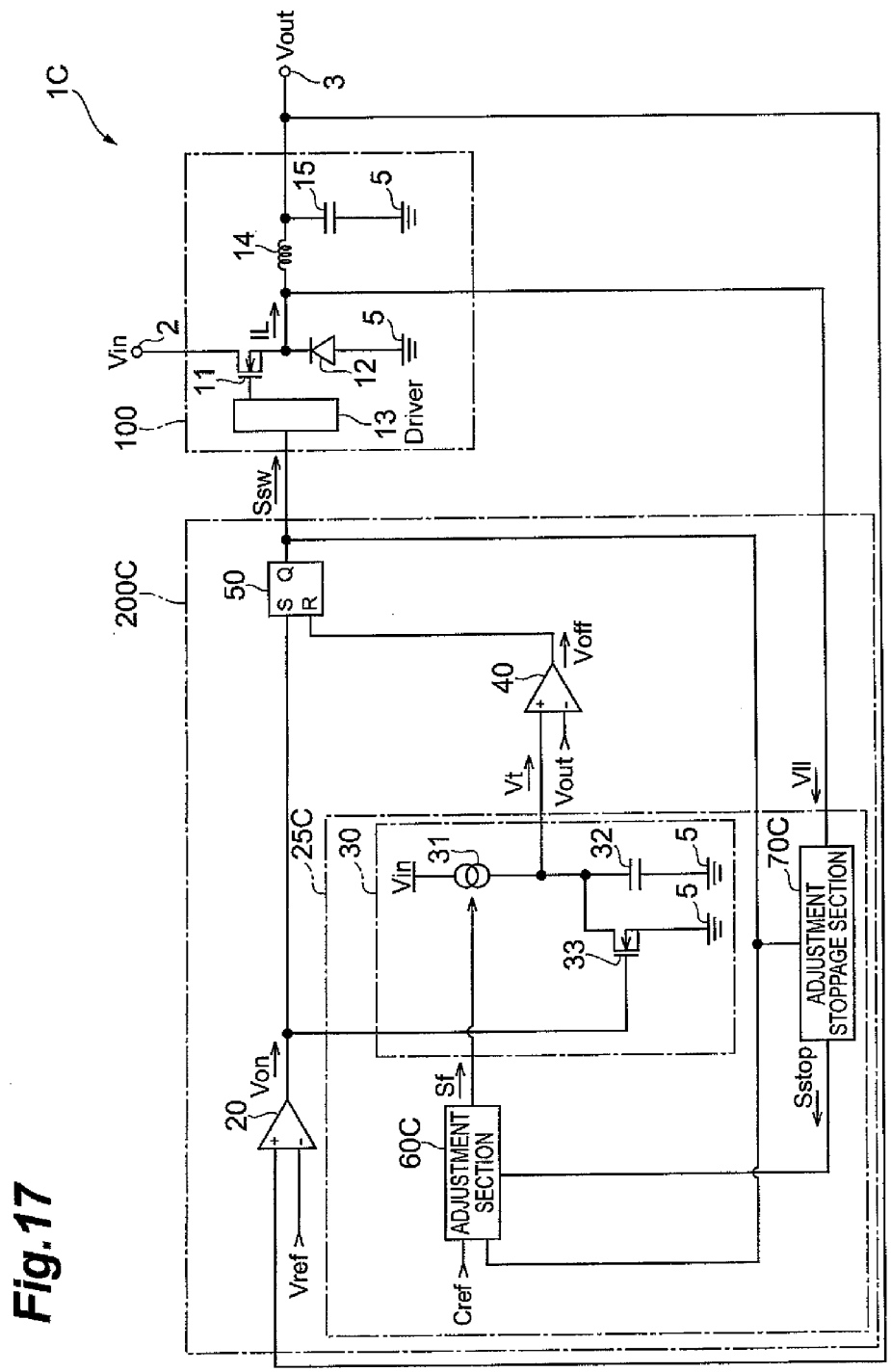
FIG. 17 is a circuit diagram which shows a comparator-system DC-DC converter according to a fourth embodiment of the present invention.

FIG. 17 is a circuit diagram which shows a comparator-system DC-DC converter according to the fourth embodiment of the present invention. The comparator-system DC-DC converter 1C which is shown in FIG. 17 differs from the comparator-system DC-DC converter 1B in the third embodiment in that the comparator-system DC-DC converter 1C comprises a control unit 200C in place of the control unit 200B of the comparator-system DC-DC converter 1B. The remaining constitution of the comparator-system DC-DC converter 1C is the same as that of the comparator-system DC-DC converter 1B.

The control unit 200C differs from the control unit 200B in that the control unit 200C comprises an adjustment section 60C and an adjustment stoppage section 70C in place of the adjustment section 60B and adjustment stoppage section 70 of the control unit 200B. The remaining constitution of the control unit 200C is the same as that of the control unit 200B. In this embodiment, the timer section 30, adjustment section 60C, and adjustment stoppage section 70C function as frequency control means 25C.

Figure 18:
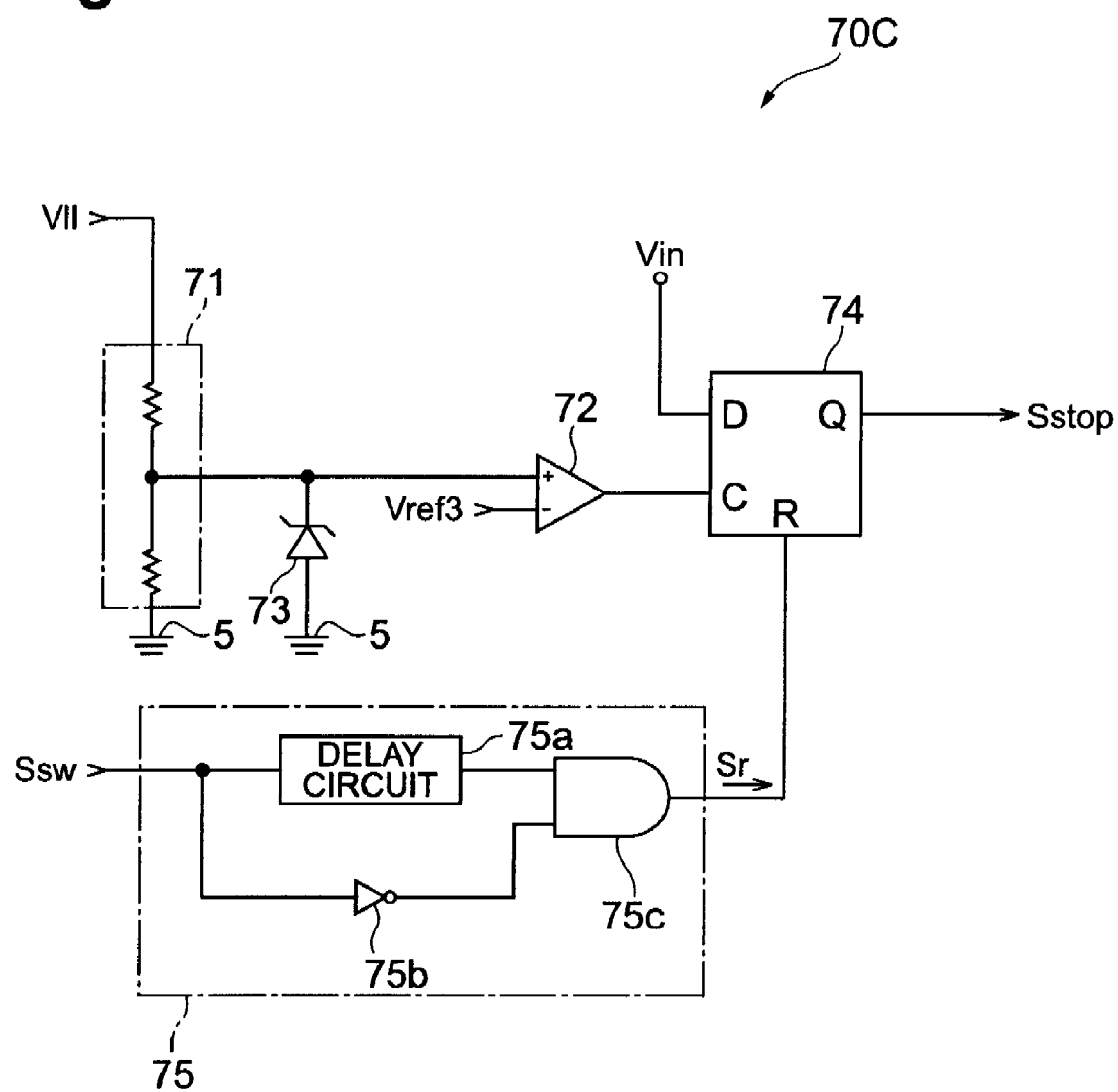
FIG. 18 is a circuit diagram which shows an adjustment stoppage section which is shown in FIG. 17.

FIG. 18 is a circuit diagram which shows the adjustment stoppage section 70C which is shown in FIG. 17. The adjustment stoppage section 70C which is shown in FIG. 18 differs from the adjustment stoppage section 70 in the third embodiment in that the stoppage section 70C further comprises a delay reset signal generation section 75. The remaining constitution of the adjustment stoppage section 70C is the same as that of the adjustment stoppage section 70.

The adjustment stoppage section 70C comprises a delay circuit 75a which delays the phase of the switching control signal Ssw, a NOT circuit 75b which inverts the switching control signal Ssw, and an AND circuit 75c the two input terminals of which are connected to a delay circuit 75a and a NOT circuit 75b. The adjustment stoppage section 70C generates a high-level pulse voltage at the end time point of the ON pulse of the switching control signal Ssw and supplies same to the reset terminal of the D-FF 74.

Figure 19:
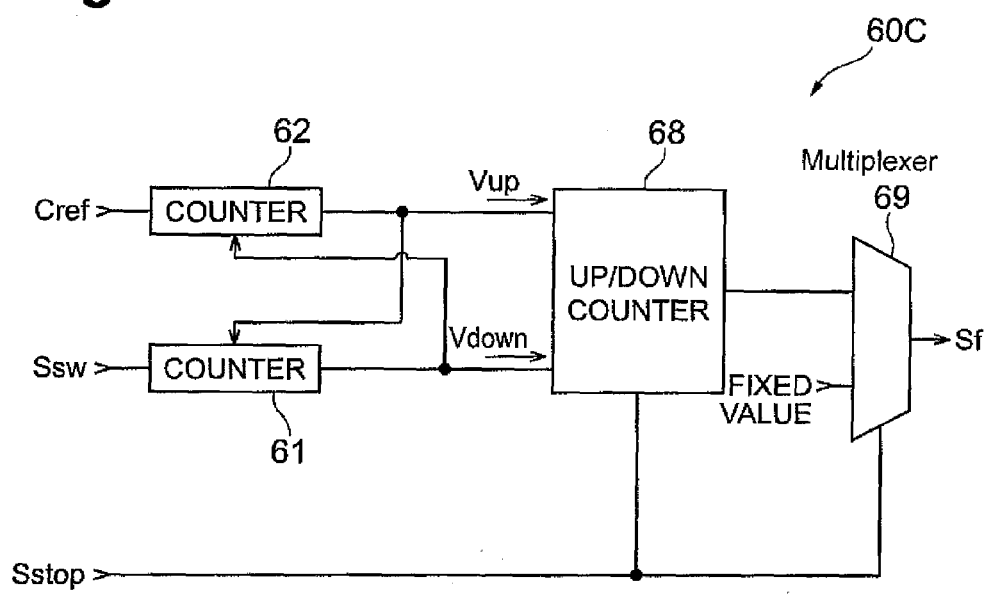
FIG. 19 is a circuit diagram which shows an adjustment section which is shown in FIG. 17.

FIG. 19 is a circuit diagram which shows an adjustment section 60C which is shown in FIG. 17. The adjustment section 60C which is shown in FIG. 19 differs from the adjustment section 60 in that the adjustment section 60C further comprises a multiplexer 69. The remaining constitution of the adjustment section 60C is the same as that of the adjustment section 60.

One input terminal of the multiplexer 69 is connected to the output terminal of the up/down counter 68 and a fixed value is input to the other input terminal. The adjustment stoppage signal Sstop is input to the control terminal of the multiplexer 69. The multiplexer 69 selects the output signal of the up/down counter 68 when the adjustment stoppage signal. Sstop is a low-level signal and outputs the output signal as the frequency control signal Sf. The multiplexer 69 selects a fixed value when the adjustment stoppage signal Sstop is a high-level signal and outputs the fixed value as the frequency control signal Sf.

The adjustment stoppage signal Sstop is also input to the control terminal of the up/down counter 68.

Figure 20:
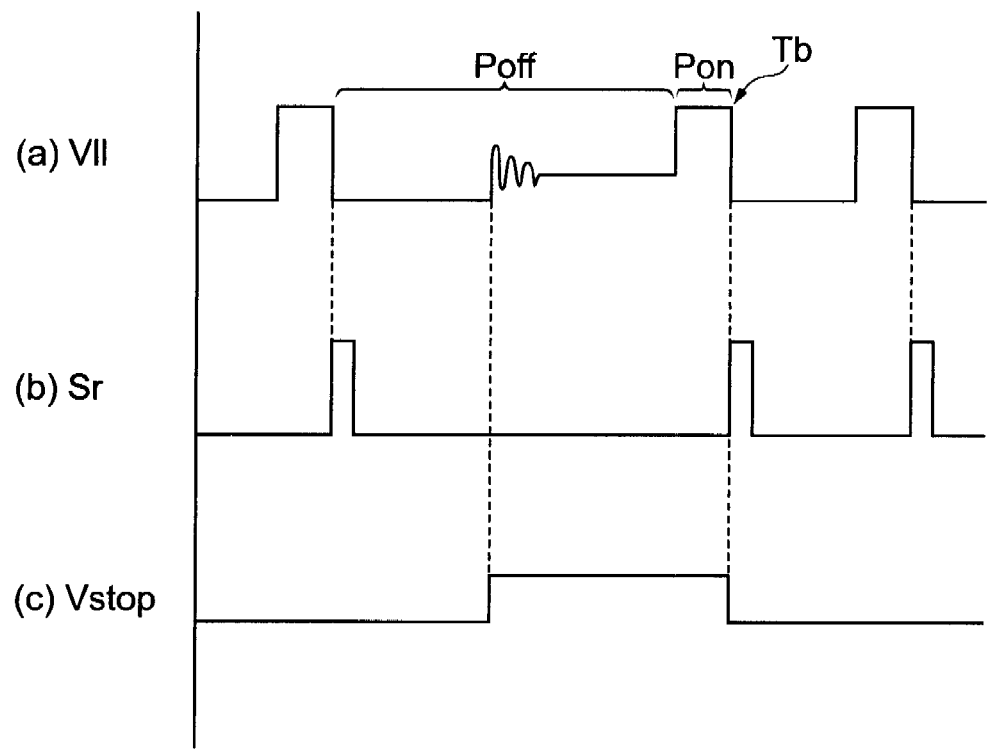
FIG. 20 is a timing chart which shows the respective signal waveforms of the discontinuous current mode of the adjustment stoppage section which is shown in FIG. 18.

FIG. 20 is a timing chart which shows the respective signal waveforms of the discontinuous current mode of the adjustment stoppage section 70C which is shown in FIG. 18. As shown in FIG. 20, when the resonance voltage V11 at one end of the inductor 14 is detected by the comparator 72 ((a) of FIG. 20), the generation of a high-level adjustment stoppage signal Sstop is started by the D-FF 74. Thereafter, a high-level pulse voltage Sr is generated by a delay reset circuit at the end time point Tb of the ON pulse Pon of the switching control signal Ssw ((b) of FIG. 20) and the generation of the high-level adjustment stoppage signal Sstop is terminated by the D-FF 74 ((c) of FIG. 20).

When a high-level adjustment stoppage signal Sstop is generated, the up/down counter 68 stops counting and the multiplexer 69 changes from the output signal of the up/down counter 68 to a fixed value and outputs same as the frequency control signal Sf.

Thus, the comparator-system DC-DC converter 1C of the fourth embodiment makes it possible to stop the adjustment processing of the ON width of the ON pulse until the ON pulse production period in addition to periods in which the output current is equal to or less than 0 A. As a result, the count of the up/down counter 68 can be delayed and the adjustment of the ON width of the ON pulse can be suppressed. Therefore, the comparator-system DC-DC converter 1C of the fourth embodiment also makes it possible to obtain the same benefits as the third embodiment.

The present invention is not limited to the above embodiments and can be modified in a variety of ways.

Figure 21:
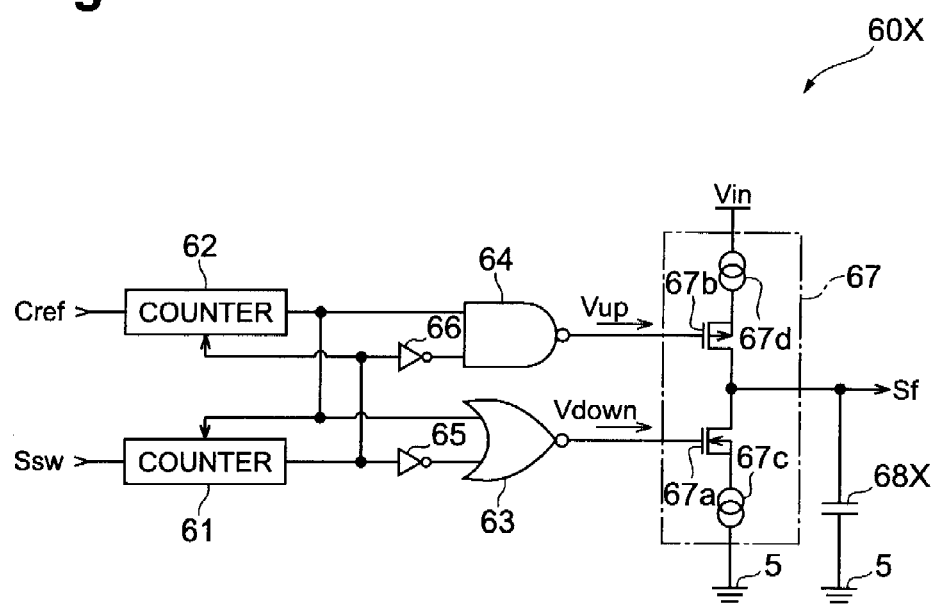
FIG. 21 is a circuit diagram which shows an adjustment section according to a modified example 1.

Although this embodiment takes the example of a digital circuit which generates a digital frequency control signal Sf as the adjustment section 60, an analog circuit which generates an analog frequency control signal Sf is also applicable. FIG. 21 is a circuit diagram which shows the adjustment section according to a modified example 1. The adjustment section 60X of the modified example 1 shown in FIG. 21 comprises a NOR circuit 63 in place of the up/down counter 68 in the adjustment section 60, a NAND circuit 64, two inverters 65 and 66, a charge pump circuit 67, and an adjustment capacitor 68X. The remaining constitution of the adjustment section 60X is the same as that of the adjustment section 60.

One input terminal of the NOR circuit 63 is connected to the output terminal of the first counter 61 via the inverter 65 and the other input terminal is connected to the output terminal of the second counter 62. The output terminal of the NOR circuit 63 is connected to the charge pump circuit 67.

One input terminal of the NAND circuit 64 is connected to the output terminal of the second counter 62 and the other input terminal is connected to the output terminal of the first counter 61 via the inverter 66. The output terminal of the NAND circuit 64 is connected to the charge pump circuit 67.

The charge pump circuit 67 is constituted by a transistor 67a consisting of an n-type MOSFET, a transistor 67b consisting of a p-type MOSFET, and two fixed current sources 67c and 67d. The source of the transistor 67a is connected to the GND5 via the fixed current source 67c and the drain of the transistor 67a is connected to the drain of the transistor 67b. The source of the transistor 67b has an input voltage Vin input thereto via the fixed current source 67d. A pulse voltage Vdown which is output by the NOR circuit 63 and the pulse voltage Vup which is output by the NAND circuit 64 are input to the respective gates of the transistors 67a and 67b. The adjustment capacitor 68X is connected between the drain of the transistors 67a and 67b and GND5.

In the adjustment section 60X, in cases where the frequency of the switching control signal Ssw is lower than the frequency of the reference clock Cref, the first counter 61 ends the count before the second counter 62 and generates an output voltage at a high level, and the NAND circuit 64 outputs a low level pulse voltage Vup. Hence, the capacitor 68X is charged by the charge pump circuit 67 and the level of the frequency control signal Sf rises. However, in cases where the frequency of the switching control signal Ssw is higher than the frequency of the reference clock Cref, the second counter 62 ends the count before the first counter 61 and generates an output voltage at a high level, and the NOR circuit 63 outputs a high-level pulse voltage Vdown. Hence, the capacitor 68X is discharged by the charge pump circuit 67 and the level of the frequency control signal Sf drops.

According to Modified example 1, input voltage Vin is input to the source of the transistor 67b via the fixed current source 67d. However, in the case of a power source which comprises a predetermined potential difference from the GND5 and which is capable of supplying the output current which is required for the fixed current sources 67c and 67d, there are no restrictions on the input voltage Vin of the input terminal 2.

Figure 22:
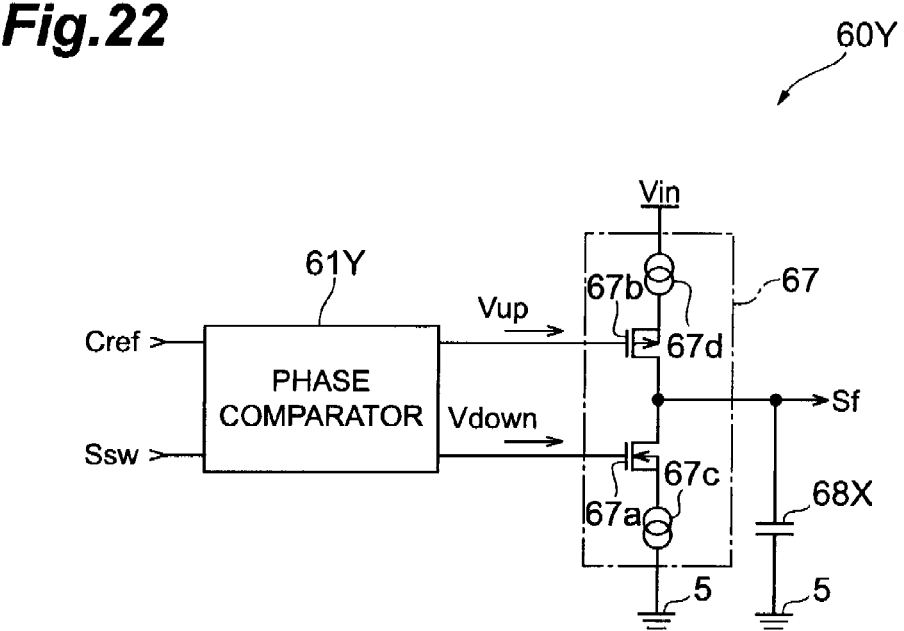
FIG. 22 is a circuit diagram which shows an adjustment section according to a modified example 2.

In addition, a circuit which employs a phase comparator is also applicable to the adjustment section 60. FIG. 22 is a circuit diagram which shows the adjustment section according to Modified example 2. The adjustment section 60Y of Modified example 2 shown in FIG. 22 comprises a phase comparator 61Y in place of the first and second counters 61 and 62 respectively, the NOR circuit 63, the NAND circuit 64, and the two inverters 65 and 66 in the adjustment section 60X. The remaining constitution of the adjustment section 60Y is the same as that of the adjustment section 60X.

The switching control signal Ssw is input to one input terminal of the phase comparator 61Y while the reference clock Cref is input to the other input terminal. The phase comparator 61Y compares the phase of the switching control signal Ssw with the phase of the reference clock Cref and generates the output voltages Vdown and Vup which have values which correspond with the phase difference between the Ssw and Cref indicated by the comparison result. The phase comparator 61Y supplies the output voltage Vdown to the gate of the transistor 67a of the charge pump circuit 67 and supplies the output voltage Vup to the gate of the transistor 67b of the charge pump circuit 67.

In the adjustment section 60Y, in cases where the frequency of the switching control signal Ssw is lower than the frequency of the reference clock Cref, the phase comparator 61Y outputs a low-level pulse voltage Vup and the capacitor 68X is charged by the charge pump circuit 67 and the level of the frequency control signal Sf rises. However, in cases where the frequency of the switching control signal Ssw is higher than the frequency of the reference clock Cref, the phase comparator 61Y outputs the high-level pulse voltage Vdown and, therefore, the capacitor 68X is discharged by the charge pump circuit 67 and the level of the frequency control signal Sf drops.

Figure 23:
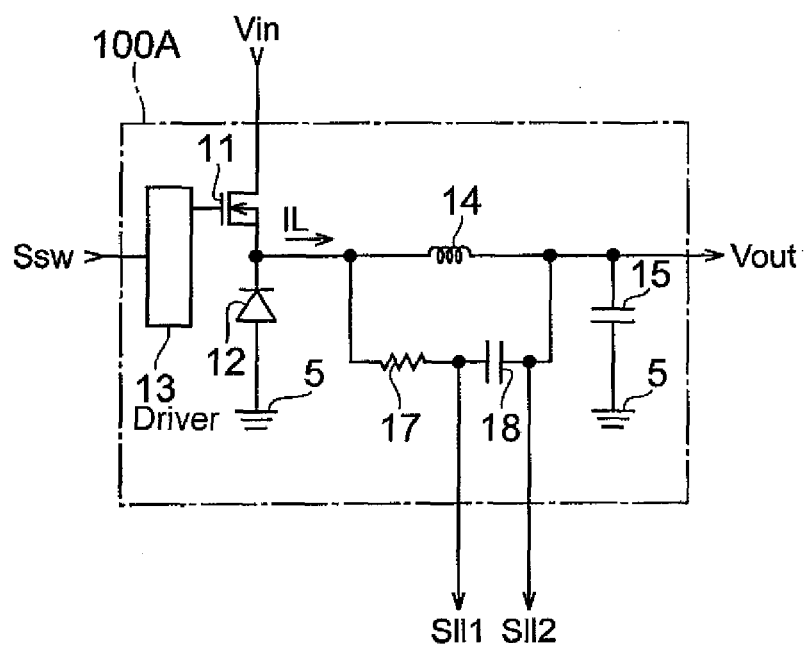
FIG. 23 shows a current detection method according to a modified example.

Furthermore, this embodiment illustrates an output current detection method which detects the period in which the output current is equal to or less than 0 A by means of a resonance voltage at one end of the inductor 14 and an output current detection method which detects a state where the output current is equal to or less than 0 A or going to be 0 A by means of the voltage across the two terminals of the resistance element 16 which is serially connected to the inductor 14. However, the output current detection method is not limited to this embodiment. The output current detection method shown in FIG. 23 is also applicable, for example. FIG. 23 shows the current detection method according to a modified example. As shown in FIG. 23, the serial circuit between the resistance element (current detection resistance element) 17 and the capacitor (current detection capacitor) 18 is connected in parallel to the inductor 14 and the time point at which the output current IL is going to become 0 A or 0V may be detected by detecting the time point at which the voltage across the terminals of the capacitor 18 is 0V or going to be 0V.

Figure 24:
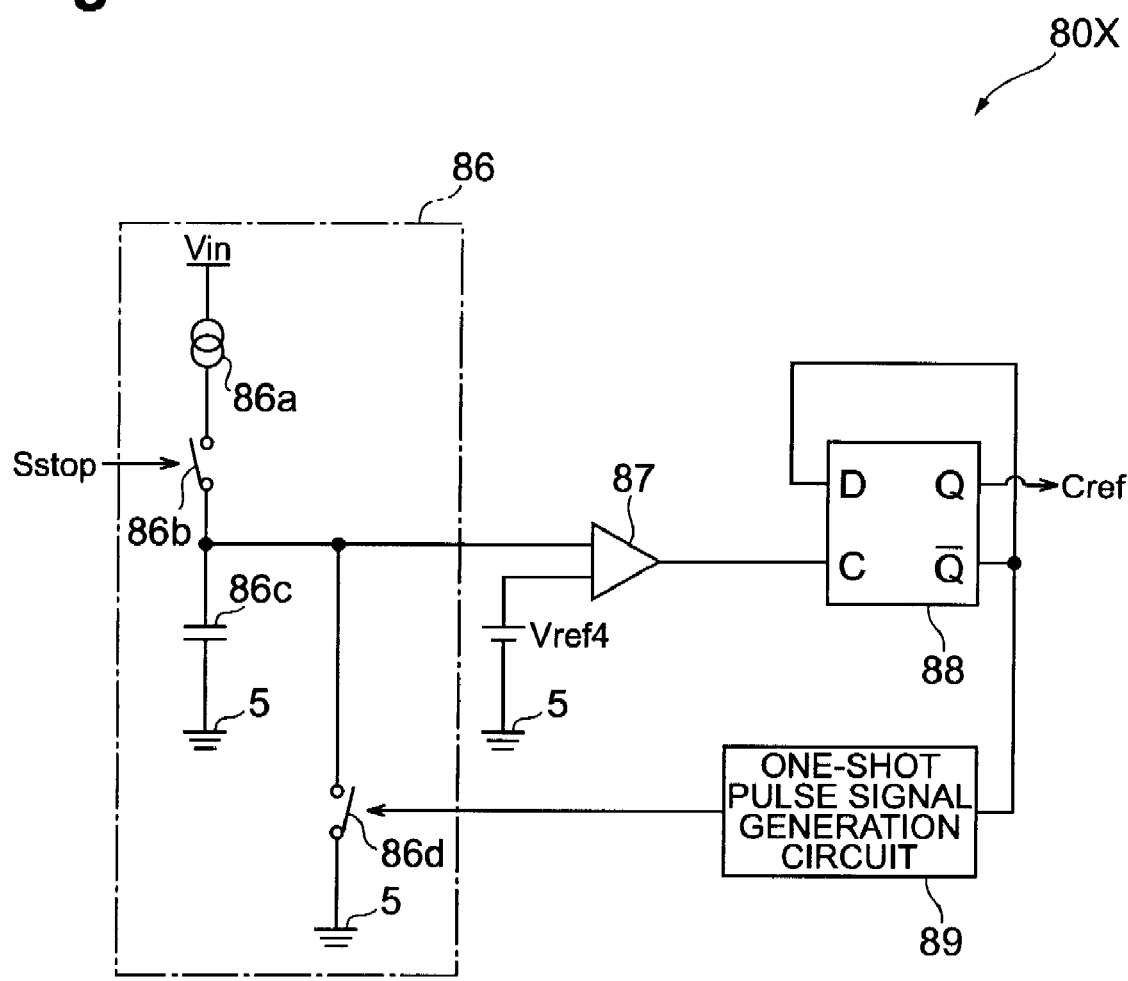
FIG. 24 is a circuit diagram which shows a reference clock generation section according to a modified example.

In addition, although this embodiment illustrates a method which stops the clock division circuits 82, 83, 84, and 85 of the reference clock generation section 80 as the method for stopping the adjustment of the predetermined ON width, the reference clock generation circuit itself may also be stopped. FIG. 24 is a circuit diagram which shows the reference clock generation section according to a modified example. The reference clock generation section 80X of the modified example shown in FIG. 24 is a ring oscillator which comprises a triangular wave generation circuit 86, a comparator 87, a D-FF circuit 88, and a one-shot pulse signal generation circuit 89. FIG. 25 is a respective part signal waveform for the reference clock generation section according to the modified example.

The triangular wave generation circuit 86 comprises a fixed current source 86a which is serially connected in order between the terminal to which the input voltage Vin is input and the terminal connected to the GND5, a switch element 86b, and a capacitor 86c. The triangular wave generation circuit 86 further comprises a switch element 86d which is connected in parallel to the capacitor 86c. The switch element 86b enters an ON state when the adjustment stoppage signal Sstop is a low level signal. However, the switch element 86d enters an ON state when a high-level pulse voltage is output by the one-shot pulse signal generation circuit 89. Thus, the triangular wave generation circuit 86 generates a saw-wave-shaped triangular wave voltage when the adjustment stoppage signal Sstop is a low level signal ((a), (b), and (d) of FIG. 25). The comparator 87 compares the triangular wave voltage with reference voltage Vref4 from the triangular wave generation circuit 86 and generates a low-level output voltage when the triangular wave voltage is smaller than the reference voltage Vref4 and generates a high-level pulse voltage when the triangular wave voltage is equal to or more than the reference voltage Vref4 ((b) and (c) of FIG. 25). The input terminal of the D-FF circuit 88 is connected to the inverting output terminal and the output voltage from the comparator 87 is input to the clock terminal. The D-FF circuit 88 inverts the level of the reference clock Cref in accordance with the pulse voltage from the comparator 87. The one-shot pulse signal generation circuit 89 outputs a pulse voltage when the level of the reference clock Cref is inverted.

Here, when the adjustment stoppage signal Sstop is a high level signal, the switch element 86b enters an OFF state, the charging of the capacitor is stopped, and the level of the triangular wave voltage from the triangular wave generation circuit 86 is latched. As a result, the level of the reference clock Cref is latched. Thus, the reference clock generation section 80X of the modified example is able to stop the generation of the reference clock Cref by stopping the reference clock generation circuit itself in accordance with the adjustment stoppage signal Sstop.

In addition, in this embodiment, the timer section 30 controls the ON time width Pon but may also control the OFF time width Poff. In this case, the drive circuit 13 generates a drive signal such that the switching element 11 enters an OFF state when the switching control signal Ssw is at a high level. In addition, in this case, the adjustment section 60 adjusts the OFF time width Poff instead of the ON time width Pon.

Furthermore, the method for changing the ON width of the ON pulse Pon of the switching control signal Sw is not limited to that of this embodiment. Rather, a variety of method forms may be considered. For example, the charging current of the timer capacitor 32 may be changed by changing the para number of the transistor 35b of the voltage follower 35, the charging current of the timer capacitor 32 may be changed by changing the para number of the transistors 37a and 37b of the current mirror circuit 37, or the charging current of the timer capacitor 32 may be changed by changing the division ratio of the input voltage division circuit 34.

Furthermore, although the frequency of the reference clock Cref of the adjustment section 60 is the same as the frequency of the switching control signal Ssw in this embodiment, the ratio between the frequency of the reference clock Cref and the frequency of the switching control signal Ssw may also be N:M (where M and N are natural numbers). Here, the adjustment section 60 adjusts the predetermined ON width of the ON pulse of the switching control signal so that the ratio between the count value of the switching control signal Ssw and the count value of the reference clock Cref is M:N. In particular, the frequency of the reference clock Cref is preferably lower than the frequency of the switching control signal Ssw. The current consumption can accordingly be reduced.

Furthermore, although the first counter 61 counts only the ON pulses of the switching control signal Ssw in this embodiment, the first counter 61 may also count at least either one of the ON pulses and OFF pulses of the switching control signal Ssw.

In addition, although the output voltage Vout is input to the negative input terminal of the second comparator in this embodiment, a reference voltage may also be input to the negative input terminal of the second comparator.

Furthermore, although a switching-type voltage conversion section which employs a diode rectification system is illustrated as the voltage conversion section in this embodiment, the voltage conversion section may also be a synchronous rectification system switching-type voltage conversion section which employs a switching element instead of the diode 12. In this case, the adjustment stoppage section stops the switching element instead of the diode 12 on the basis of an inverted detection signal.

Although an n-type MOSFET is employed as the switching element 11 of the voltage conversion section 100 in this embodiment, a p-type MOSFET may also be employed. In addition, various transistors such as a FET or a bipolar transistor can be applied to the switching element or transistor of this embodiment.

The invention claimed is:

1. A comparator-system DC-DC converter, comprising:
a voltage conversion section which has an input terminal to which an input voltage is input and a pair of output terminals, and further has a switching element having one current terminal connected to the input terminal, an inductor having one end connected to the other current terminal of the switching element and another end connected to one of the pair of output terminals, and a smoothing capacitor connected between the pair of output terminals, the voltage conversion section generating an output voltage which is obtained by voltage-converting the input voltage, across the pair of output terminals by controlling the switching element in accordance with a control signal which is a pulse signal; and
a control unit which generates the control signal for stabilizing the output voltage of the voltage conversion section,
wherein the control unit comprises:
a comparator section which compares the output voltage of the voltage conversion section with a reference voltage and determines a predetermined ON width of an ON pulse of the control signal or a predetermined OFF width of the OFF pulse of the control signal in accordance with the comparison result; and
frequency control means which compares the control signal with a reference clock and adjusts the predetermined ON width of the ON pulse or the predetermined OFF width of the OFF pulse in accordance with the comparison result so that the repetition frequency of the control signal is constant, and
wherein the frequency control means comprises an adjustment stoppage section which detects a state where an output current which flows in a direction from the switching element of the voltage conversion section toward the inductor is 0 A or a state where the output current is going to be 0 A and generates an adjustment stoppage signal which stops the processing of the frequency control means to adjust the predetermined ON width or the predetermined OFF width.

2. The comparator-system DC-DC converter according to claim 1, wherein the comparator section comprises:

a first comparator which detects that the output voltage of the voltage conversion section is smaller than the reference voltage and determines the detection time point as the start time point of the ON pulse or the OFF pulse; and a second comparator which detects that a predetermined time has elapsed since the start time point of the ON pulse or the OFF pulse and determines the detection time point as the end time point of the ON pulse or the OFF pulse, and wherein the frequency control means comprises an adjustment section which adjusts the predetermined ON width or the predetermined OFF width by adjusting the predetermined time.

3. The comparator-system DC-DC converter according to claim 1, wherein the frequency control means comprises a reference clock generation section which generates the reference clock; and in cases where the frequency control means acquires the adjustment stoppage signal from the adjustment stoppage section, the reference clock generation section temporarily stops the generation of the reference clock and stops the processing to adjust the predetermined ON width or the predetermined OFF width.

4. The comparator-system DC-DC converter according to claim 1, wherein, in cases where the frequency control means acquires the adjustment stoppage signal from the adjustment stoppage section, the frequency control means stops the comparison between the control signal and the reference clock and stops the processing to adjust the predetermined ON width or the predetermined OFF width.

5. The comparator-system DC-DC converter according to claim 1, wherein, in cases where the frequency control means acquires the adjustment stoppage signal from the adjustment stoppage section, the frequency control means stops the processing to adjust the predetermined ON width or the predetermined OFF width by substituting the result of comparing the control signal with the reference clock, with a predetermined fixed value which is determined beforehand.

* * * * *